US010798093B2

(12) United States Patent
Kaliski, Jr. et al.

(10) Patent No.: US 10,798,093 B2
(45) Date of Patent: Oct. 6, 2020

(54) GTLD DOMAIN NAME REGISTRIES RDAP ARCHITECTURE

(71) Applicant: VERISIGN, INC., Reston, VA (US)

(72) Inventors: Burton S. Kaliski, Jr., McLean, VA (US); Swapneel Sheth, Fairfax, VA (US); Scott Hollenbeck, Fairfax Station, VA (US); Andrew Fregly, Reston, VA (US)

(73) Assignee: VERISIGN, INC., Reston, VA (US)

( * ) Notice: Subject to any disclaimer, the term of this patent is extended or adjusted under 35 U.S.C. 154(b) by 283 days.

(21) Appl. No.: 15/452,997

(22) Filed: Mar. 8, 2017

(65) Prior Publication Data

US 2018/0083781 A1 Mar. 22, 2018

Related U.S. Application Data

(63) Continuation-in-part of application No. 15/269,698, filed on Sep. 19, 2016, now Pat. No. 10,523,632.

(51) Int. Cl.
*H04L 29/06* (2006.01)
*H04L 9/32* (2006.01)
*H04L 29/12* (2006.01)

(52) U.S. Cl.
CPC ........ *H04L 63/0884* (2013.01); *H04L 9/3213* (2013.01); *H04L 9/3263* (2013.01);
(Continued)

(58) Field of Classification Search
CPC . H04L 9/3226; H04L 9/3247; H04L 63/0884; H04L 9/30; H04L 63/06
See application file for complete search history.

(56) References Cited

U.S. PATENT DOCUMENTS 9,365,188 B1 * 6/2016 Penilla ................ B60R 25/2018
10,009,337 B1 * 6/2018 Fischer ................ H04L 63/105
(Continued)

OTHER PUBLICATIONS

Hollenbeck et al., "Security Services for the Registration Data Access Protocol (RDAP)", Mar. 2015, ISSN: 2070-1721, Internet Engineering Task Force (IETF), Request for Comments: 7481, pp. 1-13 (Year: 2015).*

(Continued)

*Primary Examiner* — Harunur Rashid
(74) *Attorney, Agent, or Firm* — MH2 Technology Law Group, LLP

(57) ABSTRACT

Provided is a method for providing Registration Data Access Protocol ("RDAP") responses. The method includes obtaining, at a RDAP client over a network, a RDAP query for RDAP data from a user; providing, by the RDAP client, the RDAP query and a cryptographic credential to a RDAP server, wherein the RDAP server communicates with one or more thick RDAP servers to provide respective thick RDAP answers to the RDAP query, wherein at least one the respective thick RDAP answers are encrypted using a symmetric or asymmetric cryptographic key associated with the cryptographic credential of the RDAP client; obtaining a consolidated thick RDAP answer to the RDAP query from the RDAP server; decrypting the consolidated thick RDAP answer using a symmetric or asymmetric cryptographic key associated with the cryptographic credential; and providing the thick RDAP answer that is decrypted to the user.

18 Claims, 25 Drawing Sheets

(52) U.S. Cl.
CPC ...... *H04L 61/1511* (2013.01); *H04L 61/1594* (2013.01); *H04L 61/302* (2013.01); *H04L 63/0428* (2013.01); *H04L 63/06* (2013.01); *H04L 63/0823* (2013.01)

(56) References Cited

U.S. PATENT DOCUMENTS

| | | | | |
|---|---|---|---|---|
| 2002/0136410 | A1* | 9/2002 | Hanna | H04L 9/088 380/277 |
| 2003/0140119 | A1 | 7/2003 | Acharya et al. | |
| 2004/0162983 | A1* | 8/2004 | Gotoh | H04L 9/0841 713/171 |
| 2004/0199620 | A1 | 10/2004 | Ruiz | |
| 2005/0102354 | A1* | 5/2005 | Hollenbeck | G06Q 10/02 709/203 |
| 2007/0040021 | A1* | 2/2007 | Nakayma | G06F 12/1408 235/380 |
| 2007/0208869 | A1 | 9/2007 | Adelman | |
| 2013/0061046 | A1* | 3/2013 | Joy | H04L 67/20 713/162 |
| 2013/0085932 | A1 | 4/2013 | Waldron | |
| 2014/0245012 | A1* | 8/2014 | Arya | H04L 63/0464 713/171 |
| 2017/0141926 | A1* | 5/2017 | Xu | H04L 9/3247 |
| 2018/0083919 | A1 | 3/2018 | Kane et al. | |

OTHER PUBLICATIONS

Newton et al., R"egistration Data Access Protocol Query Format" Dec. 23, 2014, Network work group, internet-draft, pp. 1-20 (Year: 2014).*

Hess el al., "Advanced Client/Server Authentication in TLS" Apr. 2002; https://www.researchgate.net, 2002 (Year: 2002).*

Extended European Search Report issued in corresponding European Patent Application No. 18159568.7 dated Aug. 1, 2018, pp. 1-11.

Anonymous, "WHOIS—Wikipedia", (2015) XP055367775; retrieved from the Internet: https://en.wikipedia.org/w/index.php?title=WHOIS&oldid=689698417, pp. 1-14.

Extended European Search Report dated Feb. 13, 2018, European Application No. 17191912.9, pp. 1-9.

Anonymous, "RDAP Operational Profile for gTLD Registries and Registrars", Version 1.0, IETF, Dec. 3, 2015, pp. 1-26.

S. Hollenbeck, "Federated Authentication for the Registration Data Access Protocol (RDAP) Using Open ID Connect", IETF, Apr. 26, 2016, pp. 1-22.

A. Newton et al., "JSON Responses for the Registration Data Access Protocol (RDAP)", IETF, Mar. 2015, pp. 1-78.

M. Blanchet et al., "Finding the Authoritative Registration Data (RDAP) Service", IETF, Mar. 2015, pp. 1-18.

S. Hollenbeck et al., Security Services for the Registration Data Access Protocol (RDAP), IETF, Mar. 2015, pp. 1-14.

A. Newton et al., "Registration Data Access Protocol (RDAP) Query Format", IETF, Mar. 2015, pp. 1-20.

A. Newton et al., "HTTP Usage in the Registration Data Access Protocol (RDAP)", IETF, Mar. 2015, pp. 1-16.

PTO Non-Final Office Action dated Mar. 22, 2018, U.S. Appl. No. 15/269,698, pp. 1-16.

A. Newton et al., "Registration Data Access Protocol Query Format", Network Working Group, Dec. 23, 2014, pp. 1-20.

U.S. Office Action issued in corresponding U.S. Appl. No. 15/269,698 dated Apr. 17, 2019, pp. 1-16.

European Office Action issued in corresponding European Patent Application No. 17 191 912.9 dated Feb. 3, 2020, 4 pages.

European Intention to Grant issued in corresponding European Patent Application No. 18 159 568.7 dated Mar. 24, 2020, 7 pages.

* cited by examiner

GTLD DOMAIN NAME REGISTRIES RDAP ARCHITECTURE

CROSS REFERENCE TO RELATED APPLICATIONS

This application is a continuation-in-part to U.S. patent application Ser. No. 15/269,698 filed on Sep. 19, 2016, which is hereby incorporated by reference by its entirety.

FIELD

The present disclosure relates generally to registration data access protocol ("RDAP") for domain name registries ("DNR").

BACKGROUND

RDAP is a replacement for WHOIS and defines a representational state transfer ("REST") protocol for retrieving domain-related information. Internet Corporation for Assigned Names and Numbers ("ICANN") has indicated to registrars and registries that they are to provide RDAP with implementation beginning in 2017. An RDAP Service is a service that conforms to the RDAP protocol and provides access to a well-defined subset of domains, such as all second-level domains under a top level domain ("TLD") or all domains registered by a registrar.

SUMMARY

According to examples of the present disclosure, a method for providing Registration Data Access Protocol ("RDAP") responses is provided. The method comprises obtaining, at a RDAP client over a network, a RDAP query for RDAP data from a user; providing, by the RDAP client, the RDAP query and a cryptographic credential to a RDAP server, wherein the RDAP server communicates with one or more thick RDAP servers to provide respective thick RDAP answers to the RDAP query, wherein at least one the respective thick RDAP answers are encrypted using a symmetric or asymmetric cryptographic key associated with the cryptographic credential of the RDAP client; obtaining a consolidated thick RDAP answer to the RDAP query from the RDAP server; decrypting the consolidated thick RDAP answer using a symmetric or asymmetric cryptographic key associated with the cryptographic credential; and providing the thick RDAP answer that is decrypted to the user.

According to examples of the present disclosure, a system for providing Registration Data Access Protocol ("RDAP") responses is provided. The system comprises one or more processors; and a memory system comprising one or more computer-readable media, wherein the one or more computer-readable media contain instructions that, when executed by the one or more processors, cause the one or more processors to perform operations comprising: obtaining, at a RDAP client over a network, a RDAP query for RDAP data from a user; providing, by the RDAP client, the RDAP query and a cryptographic credential to a RDAP server, wherein the RDAP server communicates with one or more thick RDAP servers to provide respective thick RDAP answers to the RDAP query, wherein at least one the respective thick RDAP answers are encrypted using a symmetric or asymmetric cryptographic key associated with the cryptographic credential of the RDAP client; obtaining a consolidated thick RDAP answer to the RDAP query from the RDAP server; decrypting the consolidated thick RDAP answer using a symmetric or asymmetric cryptographic key associated with the cryptographic credential; and providing the thick RDAP answer that is decrypted to the user.

According to examples of the present disclosure, a non-transitory computer readable storage medium for providing Registration Data Access Protocol ("RDAP") responses is provided. The non-transitory computer readable storage medium comprising instructions for causing one or more processors to perform a method comprising obtaining, at a RDAP client over a network, a RDAP query for RDAP data from a user; providing, by the RDAP client, the RDAP query and a cryptographic credential to a RDAP server, wherein the RDAP server communicates with one or more thick RDAP servers to provide respective thick RDAP answers to the RDAP query, wherein at least one the respective thick RDAP answers are encrypted using a symmetric or asymmetric cryptographic key associated with the cryptographic credential of the RDAP client; obtaining a consolidated thick RDAP answer to the RDAP query from the RDAP server; decrypting the consolidated thick RDAP answer using a symmetric or asymmetric cryptographic key associated with the cryptographic credential; and providing the thick RDAP answer that is decrypted to the user.

In some examples, the method further comprising authorizing the user with an authorization service.

In some examples, the thick RDAP answer is provided based on the user being authorized.

In some examples, the thick RDAP answer is provided based on an access token issued by the authorization service and digitally signed by a private cryptographic key of the authorization service.

In some examples, the authorization service issues an authentication token for the user that comprises a claim that identifies a subject that has been authenticated.

In some examples, the method further comprises obtaining an access token issued by an authorization service and digitally signed by a private cryptographic key of the authorization service.

In some examples, a RDAP server is configured to encrypt RDAP answers using one or more encryption keys provided by a key management service.

In some examples, the one or more encryption keys have different validity periods.

In some examples, a key management service uses claims in an access token to determine entities for which it will provide encryption keys.

In some examples, the method further comprises providing, by the RDAP client, a domain name of a thick RDAP server from the one or more thick RDAP servers to an identity provider; obtaining, at the RDAP client, a cryptographic token from the identity provider based on the domain name, wherein the cryptographic token comprises an audience claim contained in the domain name of the thick RDAP server.

In contrast, in a thin domain registry the domain contact information is held by the registrar. The registry WHOIS or RDAP just holds a referral to the registrar, the registration, expiry, update date, nameservers and domain status. In a thin registry, the contacts are not transferred as part of the transfer itself as they are in a thick registry. Thus the gaining/new registrar has to parse them when a domain is transferred or replace them with the contacts that were entered on the order. The lack of mandated registrar WHOIS output makes the parsing of WHOIS information difficult. Currently, .com and .net are the only gTLDs still using a thin registry. Many of the country code top level domain ("ccTLD") registries that are running thin registries are switching to using extensible provisioning protocol ("EPP") for the registrars to communicate with them, which normally involves the transfer to a thick WHOIS or thick RDAP.

According to examples of the present disclosure, a Registration Data Access Protocol ("RDAP") client computer is provided that comprises one or more processors; and a memory system comprising one or more non-transitory computer-readable media storing instructions that, when executed by at least one of the one or more processors, cause the RDAP client computer to perform a method for providing RDAP responses, the method comprising: obtaining a RDAP query for RDAP data from a user; providing the RDAP query to one or more thick RDAP services; obtaining an answer to the RDAP query from the one or more thick RDAP services; and providing the answer to the user.

In some examples, the method can further comprise prior to the providing the RDAP query, determining, by the RDAP client, that the RDAP data is not able to be retrieved from a local storage of the RDAP client.

In some examples, the method can further comprise the RDAP client is not authoritative for the RDAP data.

In some examples, the method can further comprise authorizing the user with an authorization service.

In some examples, the answer is provided based on the user being authorized.

In some examples, the answer is provided based on an access token issued by the authorization service and digitally signed by a private cryptographic key of the authorization service.

In some examples, the authorization service issues an authentication token for the user that comprises a claim that identifies a subject that has been authenticated.

In some examples, the method can further comprise obtaining an access token issued by an authorization service and digitally signed by a private cryptographic key of the authorization service.

In some examples, the answer is aggregated with other answers being providing to the user.

In some examples, the one or more thick RDP services comprise a RDAP bootstrap service, a registry RDAP service, a registrar information RDAP service, and a registrar RDAP service.

In some examples, providing the RDAP query to the thick RDAP service further comprises providing the RDAP query to a virtual thick RDAP service and determining one or more RDAP services to query based on locally stored thin RDAP data and IANA registry of gTLD registry providers.

In some examples, the answer comprises one or more referrals to the one or more RDAP services that contain answers to the RDAP query.

In some examples, the RDAP client is operable to perform batch queries by sending a number of queries at a time to alternative RDAP services and to produce consolidated results from the responses of the batched queries.

In some examples, the RDAP client is operable to perform asynchronous batch processing by providing one or more claim tickets in response to queries that have been batched and operable to provide for retrieving search results at a later time using the one or more claim tickets.

In some examples, the RDAP client is operable to allow the multiple batched queries to execute and the results to be aggregated into a single response.

In some examples, the providing the answer is based on a jurisdiction of the user, a jurisdiction of the one or more thick RDAP services, or both.

It is to be understood that both the foregoing general description and the following detailed description are exemplary and explanatory only and are not restrictive of the implementations, as claimed.

DETAILED DESCRIPTION

Figure 1:
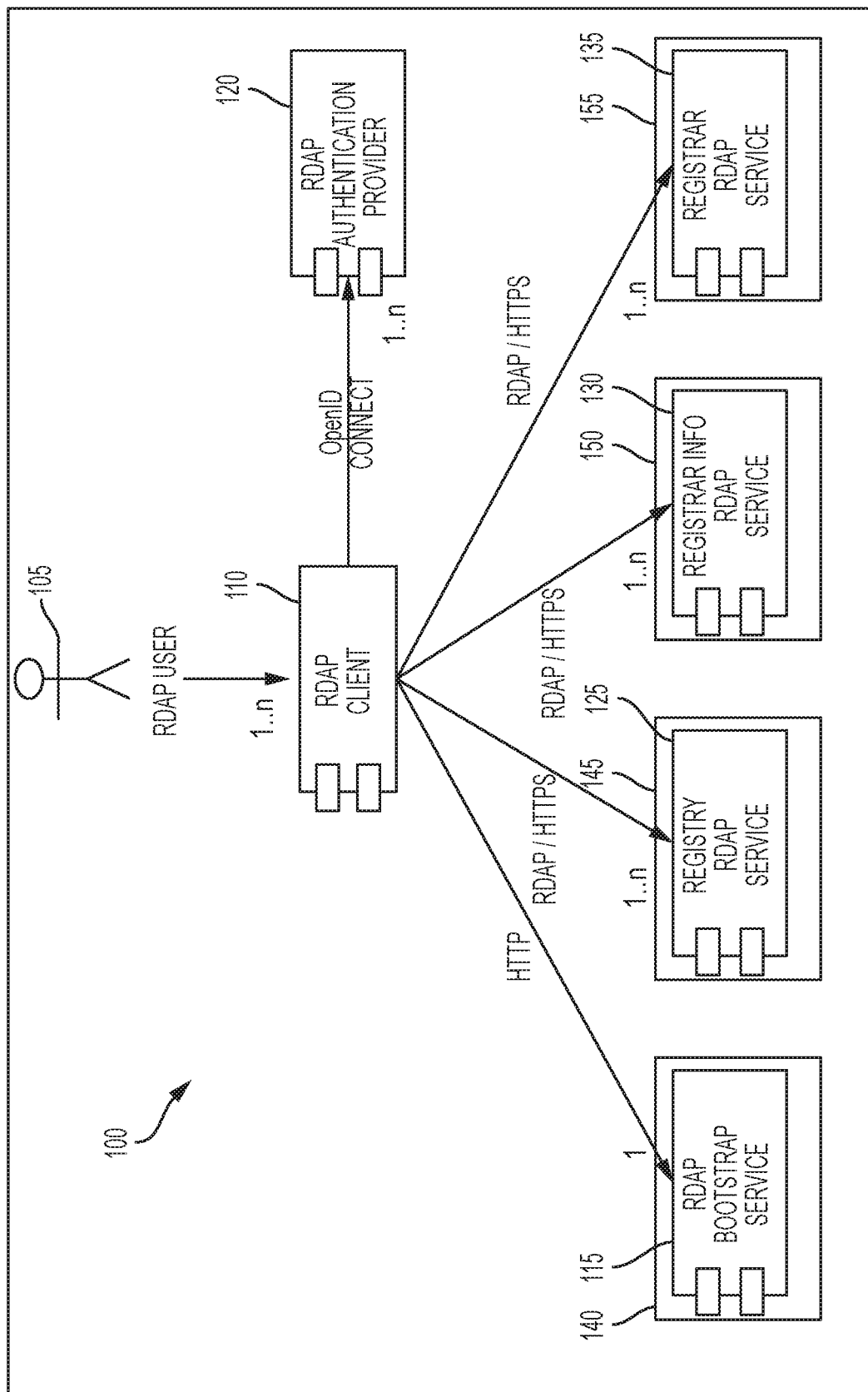
FIG. 1 shows a generic top level domain ("gTLD") DNR RDAP component diagram for the components that makeup the gTLD DNR RDAP architecture model, according to examples of the present disclosure.

Reference will now be made in detail to example implementations, which are illustrated in the accompanying drawings. When appropriate, the same reference numbers are used throughout the drawings to refer to the same or like parts.

For simplicity and illustrative purposes, the principles of the present disclosure are described by referring mainly to exemplary implementations thereof. However, one of ordinary skill in the art would readily recognize that the same principles are equally applicable to, and can be implemented in, all types of information and systems, and that any such variations do not depart from the true spirit and scope of the present disclosure. Moreover, in the following detailed description, references are made to the accompanying figures, which illustrate specific exemplary implementations. Electrical, mechanical, logical and structural changes may be made to the exemplary implementations without departing from the spirit and scope of the present disclosure. The following detailed description is, therefore, not to be taken in a limiting sense and the scope of the present disclosure is defined by the appended claims and their equivalents.

Generally speaking, examples of the present disclosure describe a virtual RDAP ("VRDAP") service that is operable to provide a thick RDAP service for TLDs and provides an approach for an RDAP service that can retrieve information from RDAP services for arbitrary TLDs. In a thick RDAP service, all the contact information needed for the domain names are held by the thick service. In contrast, in a thin domain registry the domain contact information is held by the registrar. The registry WHOIS or RDAP just holds a referral to the registrar, the registration, expiry, update date, nameservers and domain status. In a thin registry, the contacts are not transferred as part of the transfer itself as they are in a thick registry. Thus the gaining/new registrar has to parse them when a domain is transferred or replace them with the contacts that were entered on the order. The lack of mandated registrar WHOIS output makes the parsing of WHOIS information difficult. Currently, .com and .net are the only gTLDs still using a thin registry. Many of the country code top level domain ("ccTLD") registries that are running thin registries are switching to using extensible provisioning protocol ("EPP") for the registrars to communicate with them, which normally involves the transfer to a thick WHOIS or thick RDAP. An RDAP service is a service that conforms to the RDAP protocol and provides access to a well-defined subset of domains such as all second-level domains under a TLD or all domains registered by a registrar. RDAP services can provide differentiated access levels. An RDAP client is an application that interacts with RDAP services to access domain-related information.

For example, the VRDAP is operable to accept RDAP queries for data for which the VRDAP is not authoritative. During query processing, a VRDAP identifies what data it is not directly able to retrieve from its own data stores and then attempts to identify RDAP services that are to be queried to retrieve the desired data. The VRDAP may then query the identified RDAP services and receive RDAP responses from them. After receiving the response from the identified RDAP services, VRDAP consolidates the responses and returns the consolidated results as the response to the original query. In another approach, a VRDAP would not query the identified RDAP services, but rather return referrals to the identified RDAP services in the RDAP response to a client query.

VRDAP can optimize the query processing it performs by "batching queries." This capability allows it to send a number of queries at a time to alternate RDAP services and to produce consolidated results from the responses of the batched queries. VRDAP defines RDAP extension capabilities that allow for asynchronous batch processing, such as providing claim tickets in response to queries that have been batched and a mechanism for retrieving the search results at a later time using the claim ticket. VRDAP defines RDAP extension capabilities that allow the multiple batched queries to execute and the results to be aggregated into a single response.

The VRDAP approach can be used in a variety of ways. In one example, VRDAP allows a thin RDAP service to offer thick RDAP capabilities. A thin RDAP service may do this transparently to an RDAP client, in which case the thin RDAP service responds to queries it receives by querying thick RDAP services as necessary to produce thick data and return it in response to the query it received. A thin RDAP service might also return an RDAP response that contains thin data plus referrals needed for retrieving the thick RDAP data that corresponds with the thin data. In another example, an RDAP service could use this approach to provide RDAP search results for TLDs that the RDAP service is not authoritative for. In this example, the RDAP service may do this transparently to an RDAP client, in which case the RDAP service responds to queries it receives by identifying the RDAP service(s) that is/are authoritative to the TLD(s) applicable to the query and then querying the identified RDAP service(s) as necessary to produce the RDAP response that is then returned to the RDAP client. In this example, the RDAP service could also return just return an RDAP response that refers to the authoritative RDAP services that would need to be queried to fulfill the original query received from the RDAP client.

The VRDAP provides a mechanism for a particular registry to retrieve RDAP data that that particular registry does not own or store and provides mechanisms for efficiently processing batches of RDAP queries asynchronously. In doing so, the particular registry does not need to collect and store the information needed to respond to the RDAP queries the service supports. VRDAP accomplishes this by querying other RDAP services that are identified as sources for desired data. There are several advantages to this approach. It alleviates the costs and complexities involved in collecting and operating a thick registry. It facilitates offering a thick service that is compliant with PII legal requirements in various international jurisdictions. It may provide the particular registry with a legal shield against inaccuracy and omissions in data. It may also provide the particular registry with business opportunities related to being a trusted provider of consolidated data.

The VRDAP allows for batching, which allows the end user to submit multiple RDAP queries for processing. Batching allows asynchronous processing of RDAP queries, enabling RDAP clients to avoid latency and connectivity issues that are inherent in a synchronous processing approach. The VRDAP allows for routing, which allows the end user to not have to figure out which RDAP service to query to get desired data. The VRDAP allows for aggregation, which allows an RDAP client to issues only a single RDAP query to get a response that contains all the applicable data the VRDAP service is authoritative for or is able to act as a front-end for.

Turning now to the figures, FIG. 1 shows a gTLD DNR RDAP component diagram for the components that makeup the gTLD DNR RDAP architecture model 100, according to examples of the present disclosure. The components comprise the following seven elements. The first element is RDAP user 105. RDAP user 105 wants information from the RDAP services. RDAP user 105 could directly interface with the different services or could interface with RDAP client 110 to resolve the query. The second element is RDAP client 110, which is an application that interfaces with RDAP services and RDAP authentication provider 120 to resolve a query for RDAP user 105. RDAP clients 110 can include, but are not limited to, a web client or a command line client. The third element is RDAP bootstrap service 115, which is the HTTP service, defined in RFC 7484 that provides the authoritative list of registry RDAP service URLs for TLDs. The service returns a JSON response and is accessed using the URL http://data.iana.org/rdap/dns.json. The fourth element is RDAP authentication provider 120, which can be a federated authentication provider that supports RDAP user authentication that generates ID tokens that can be passed to the RDAP services to perform authorization. There can be more than one supported RDAP authentication provider 120. The fifth element is registry RDAP service 125, which is provided by the domain name registry that returns the data that the domain name registry is authoritative for (domain name and name server) and that includes a link to registrar info RDAP service 130 for RDAP client 110 to obtain the registrar information. The sixth element is registrar info RDAP service 130, which is provided by a party that is authoritative for the registrar data, like ICANN for the accredited registrars of gTLDs, to return registrar and registrar contact information, including the link to registrar RDAP service 125. There can be multiple registrar info RDAP services 130 that are authoritative for a different set of registrars (ICANN accredited vs. non-ICANN accredited). The seventh element is a registrar RDAP service 135, which is provided by the registrar that returns data that the registrar is authoritative for, such as, but not limited to, registrar domain and contact. RDAP bootstrap service 115, registry RDAP service 125, registrar info RDAP service 130, registrar RDAP service 135 are examples of RDAP services and can be provided by respective servers 140, 145, 150, 155 comprising one or more processors that are operable to execute one or more of the methods disclosed herein that are stored in one or more non-transitory computer-readable media.

In particular, RDAP client 110 is an application that interfaces with RDAP services and RDAP authentication provider 120 to resolve a query for RDAP user 105. RDAP clients 110 can leverage the RDAP services and RDAP authentication provider 120 to support queries from RDAP users 105 and display for the query results, including an RDAP web client, RDAP command line client, and RDAP client application. Each kind of RDAP client 110 can support a different set of features based on the features available in the underlying RDAP services. An example of RDAP client 110 is an RDAP web client that supports querying registration data directory services ("RDDS") data from a list of TLDs, with providing tiers of data through authentication, providing both lookup and search capabilities, and providing the aggregate results in a consistent and easily consumable fashion. RDAP client 110 may provide to RDAP user 105 an RDAP query response that is comprised of information retrieved by executing the RDAP query against one or more authoritative RDAP services. For instance, an RDAP response to RDAP user 105 may be comprised of domain name and name server information retrieved from registry RDAP service 125 and contact information retrieved from a registrar RDAP service 135. The processing flows RDAP client 110 can perform in querying RDAP services shown in the figures below. RDAP clients 110 interacting with RDAP services that implement authorization can support authorization processing flows as described in RFC 7481. Authorization of RDAP clients 110 relative to authentication and granted authorization levels is further described with reference to the below described RDAP Authorization.

RDAP bootstrap service 115 is the HTTP service, defined in RFC 7484, that provides the authoritative list of registry RDAP service 125 URLs for TLDs. The service returns a JSON response and is accessed using the URL http://data.iana.org/rdap/dns.json. The RDAP bootstrap service 115 information may be cached in RDAP client 110. RDAP clients 110 use the RDAP bootstrap service 115 as the authoritative source for the registry RDAP services 125 of TLDs. There is no personal or private information data supported by the RDAP bootstrap service. The RDAP bootstrap service 115 does not provide differentiated levels of access and does not require authorization as described herein.

RDAP authentication provider 120 is a federated authentication provider that supports RDAP user and RDAP client authentication that generates ID tokens that can be passed to the RDAP services to perform authorization. There can be more than one supported RDAP authentication provider 120. To provide any level of differentiated access other than "public," an RDAP service has a trust relationship with RDAP authentication provider 120 that issued the ID token presented to the RDAP service by RDAP client 110. A trust relationship requires that the RDAP service is capable of verifying the identity of the RDAP authentication provider 120 as a trusted RDAP authentication provider using a public key of the RDAP authentication provider 120 to verify cryptographic signatures of the RDAP authentication provider 120 on ID tokens it issues. RDAP authentication providers are capable of providing claims needed for differentiated authorization by an RDAP service. The claims may be put into ID tokens issued by RDAP authentication provider 120 or may be retrievable using an access token issues by RDAP authentication provider 120. In examples, an RDAP service will not provide differentiated levels of access if the claims needed for determining access levels are not provided to the RDAP service or retrievable by the RDAP service. In this case, an RDAP service will only provide "public" level of access. RDAP clients are be authenticated by a trusted RDAP authentication provider 120 in order to be granted anything more than "public" level of access to an RDAP service.

RDAP authentication can be based on widely adopted standards such as security assertion markup language ("SAML") and OpenID Connect. RDAP clients can be authenticated in order to be granted anything more than a default minimal level of access. Identity providers ("IDPs") are services that allow a user to authenticate a RDAP client. IDPs provide a signed authentication token as proof of authentication. Authentication tokens can be standards compliant, either SAML or JSON web token ("JWT") (for OpenID Connect). An authentication token contains a claim that identifies a "subject" that has been authenticated. The subject is unique for each user within the IDP. Other claims in an authentication token can further identify a user, such as a claim identifying the email address of the user. Authentication tokens are cryptographically signed by the private key of the issuing IDP. Authentication tokens are used to establish the identity an RDAP client is operating under when interacting with RDAP services. The IDP signature on an authentication token is cryptographically verified using the public key of the IDP. IDPs can use one of the following combinations of technologies for their underlying authentication technology: Active Directory/SAML, LDAP/SAML, OpenID Connect/JWT.

Authorization determines and grants the access level for an entity relative to resources. Access levels are determined based on at least the following factors: has the identity of the entity been authenticated; and have access rights been defined for the identity. An authorization service authorizes entities relative to resources managed by a resource service/relying party (referred to here-in as resource server per OAuth 2 terminology). OAuth 2 is an IETF defined framework that defines how clients are granted access by an authorization service to resources managed by a resource service. OpenID Connect is a specification for how an authentication service can be combined with an OAuth 2 authorization service to support both authentication and authorization. RDAP services can follow the OAuth 2 protocol for authorizing RDAP clients and support OpenID Connect for both authentication and authorization. For example, IETF RFC 7521 can be followed, which defines a framework to support authentication as part of authorization including how authentication tokens are passed in authorization requests to an OAuth 2 authorization service. IETF RFC 7522 defines how SAML authentication assertions are used for this and IETF RFC 7523 defines how JWT ID tokens are used for this. IETF RFCs 7521-7523 require the IDP to specify the "audience" (authorization service) for the authentication token. IETF draft, "OAuth 2.0 Token Exchange: An STS for the REST of Us" specifies the means by which an IDP can be informed of the audience for an authentication token. The various examples provided herein for the interactions between an IDP, an RDAP client, and RDAP services can use these referenced standards.

Registry RDAP service 125 supports queries and returns the data that the domain name registry is authoritative for and includes a link to the registrar info RDAP service 130 for RDAP client 110 to obtain the registrar information. The data that the domain name registry is authoritative for includes the domain name and name server data used to manage the domain name and name server, and to generate the DNS zone. The referenced registrar info RDAP service 130 can be used to get the registrar information, including the URL for registrar RDAP service, for RDAP client 110 to obtain all of the domain name and name server related information that RDAP client 110 is authorized for. There is no personal or private information data supported by the registry RDAP service 125, so use of RDAP authentication provider 120 is optional, but registry RDAP service 125 supports the passing of the ID token. Registry RDAP service 125 supports the following queries as defined in RFC 7482: 1. Domain Path Segment Specification 2. Nameserver Path Segment Specification 3. Domain Search 4. Nameserver Search.

"Table 1—Domain Object Fields" shows the list of domain object fields that may or are be returned in the RDAP response for domain objects with a reference to the location within the RDAP response, according to RFC 7483. The fields that are returned include a "Yes" and the fields that may be returned include a "No" for the required column. This table is based on "Appendix B: Data Element Mappings" in the Registration Data Access Protocol (RDAP) Operational Profile for gTLD Registries and Registrars. All the fields are available using the "public" authorization tier.

TABLE 1

Domain Object Fields

| Field | Required (Yes, No) | Location in RDAP Response |
|---|---|---|
| Domain Name | Yes | ldhName |
| Domain ID | Yes | Domain ID |
| Updated Date | No | events.eventAction "last changed" |
| Creation Date | Yes | events.eventAction "registration" |
| Registry Expiry Date | Yes | events.eventAction "expiration" |
| Domain Status | Yes | status object |
| Name Server | No | nameservers.ldhname |
| DNSSEC | Yes | secureDNS object |
| Internationalized Domain Name ("IDN") | Yes for IDN domain, No for ASCII domain | unicodeName |
| Registrar | Yes | publicIDs.identifier in entities.roles registrar |
| Registrar Link | Yes | "registrar" links element to the registrar entity in the Registrar Info RDAP |

"Table 2—Name Server Object Fields" shows the list of name server object fields that may or are be returned in the RDAP response for name server objects with a reference to the location within the RDAP response, according to RFC 7483. The fields that are returned include a "Yes" and the fields that may be returned include a "No" for the required column. This table is based on "Appendix B: Data Element Mappings" in the Registration Data Access Protocol (RDAP) Operational Profile for gTLD Registries and Registrars. All the fields are available using the "public" authorization tier.

TABLE 2

Name Server Object Fields

| Field | Required (Yes, No) | Location in RDAP Response |
|---|---|---|
| Server Name | Yes | nameserver.ldhName |
| IP Address | No | nameserver.ipAddresses |
| Registrar | Yes | entities.roles regisrar |
| Registrar Link | Yes | "registrar" links element to the registrar entity in the Registrar Info RDAP Service |

Registrar info RDAP service 130 is an RDAP service provided by a party that is authoritative for the registrar data, like ICANN for gTLDs, to return registrar and registrar contact information, including a link to registrar RDAP service 135. Links to registrar RDAP services 135 are used for RDAP clients 110 to use in identifying authoritative registrar RDAP services 135 to query for contact information and domain information authoritative to the registrar. Registrar info RDAP service 130 returns URLs for registrar RDAP service 135 in responses to RDAP registrar queries.

"Table 3—Registrar Object Fields" shows the list of registrar object fields under the entities.role "registrar" that may or are be returned in the RDAP response for registrar objects with a reference to the location within the RDAP response, according to RFC 7483. The fields that are returned include a "Yes" and the fields that may be returned include a "No" for the required column. This table is based on "Appendix B: Data Element Mappings" in the Registration Data Access Protocol (RDAP) Operational Profile for gTLD Registries and Registrars. All the fields are available using the "public" authorization tier.

TABLE 3

Registrar Object Fields

| Field | Required (Yes, No) | Location in RDAP Response |
|---|---|---|
| Registrar Name | Yes | jCard fn |
| Registrar Street | Yes | Grouped into the adr member |
| Registrar City | Yes | Grouped into the adr member |
| Registrar State/Province | No | Grouped into the adr member |
| Registrar Postal Code | No | Grouped into the adr member |
| Registrar Country | Yes | Grouped into the adr member |
| Registrar Phone Number | No | tel with a type parameter voice |
| Registrar Phone Number Ext | No | Ext |
| Registrar Fax | No | tel with a type parameter |
| Registrar Fax Ext | Yes | Ext |
| Registrar Email | Yes | Email |

"Table 4—Registrar Contact Object Fields" shows the list of registrar contact object fields under the entities.role "administrative" for an administrative contact, entities.role "technical" for a technical contact, and entities.role "abuse" for an abuse contact, that may or are returned in the RDAP response for registrar contact objects with a reference to the location within the RDAP response, according to RFC 7483. The fields that are returned include a "Yes" and the fields that may be returned include a "No" for the required column. The fields that may be returned are subject to authentication and authorization levels defined in the RDAP authorization section. The table indicates the minimum authorization level required in order for a field to be returned in the access level column. The fields that may be returned may require a higher access level than shown in the table based on an RDAP Service adherence to privacy law. This table is based on "Appendix B: Data Element Mappings" in the Registration Data Access Protocol (RDAP) Operational Profile for gTLD Registries and Registrars.

TABLE 4

Registrar Contact Object Fields

| Field | Required | Access Level | Location in RDAP Response |
|---|---|---|---|
| Contact | Yes | Public | jCard fn |
| Phone Number | No | Extended | tel with a type parameter voice |
| Phone Number Ext | No | Extended | ext |
| Fax Number | No | Extended | tel with a type parameter fax |
| Fax Number Ext | No | Extended | ext |
| Email | No | Private | email |

Registrar RDAP service 135 is an RDAP service provided by the registrar that returns data that the registrar is authoritative for (registrar domain and contact). Personal or private information data may be provided in RDAP responses from registrar RDAP service 135. Registrar RDAP services 135 supports the use of the ID token created by RDAP authentication provider 120 for determining differentiated levels of access to RDAP data. Registrar RDAP service 135 supports the following queries as defined in RFC 7482: 1. Domain Path Segment Specification 2. Entity Path Segment Specification 3. Domain Search 4. Entity Search "Table 5—Registrar Domain Object Fields" shows the list of domain object fields authoritative to the registrar that may be or are returned in the RDAP response for domain objects with a reference to the location within the RDAP response, according to RFC 7483. The fields that are returned include a "Yes" and the fields that may be returned include a "No" for the required column. This table is based on "Appendix B: Data Element Mappings" in the Registration Data Access Protocol (RDAP) Operational Profile for gTLD Registries and Registrars. All the fields are available using the "public" authorization tier.

TABLE 5

Registrar Domain Object Fields

| Field | Required (Yes, No) | Location in RDAP Response |
|---|---|---|
| Domain Name | Yes | ldhName |
| Registrar Registration Expiration Date | No | events.eventAction "registrar expiration" |
| Reseller | No | Enities.role reseller |

"Table 6—Contact Object Fields" shows the list of contact object fields under the entities.role "registrant" for a registrant contact, entities.role "administrative" for an administrative contact, entities.role "technical" for a technical contact, and entities.role "billing" for a billing contact, that may or are returned in the RDAP response for contact objects with a reference to the location within the RDAP response, according to RFC 7483. The fields that are returned include a "Yes" and the fields that may be returned include a "No" for the required column. The fields that may be returned are subject to authentication and authorization levels discussed in the RDAP authorization section. The table indicates the minimum authorization level required in order for a field to be returned in the access level column. The fields that may be returned may require a higher access level than shown in the table based on an RDAP service adherence to privacy law. This table is based on "Appendix B: Data Element Mappings" in the Registration Data Access Protocol (RDAP) Operational Profile for gTLD Registries and Registrars.

TABLE 6

Contact Object Fields

| Field | Required (Yes, No) | Access Level | Location in RDAP Response |
|---|---|---|---|
| Contact ID | Yes | Public | Entity handle |
| Contact Name | Yes | Public | j Card "fn" |
| Contact Organization | No | Extended | Org |
| Contact Street | No | Extended | Grouped into the adr member |
| Contact City | No | Extended | Grouped into the adr member |
| Contact State/Province | No | Extended | Grouped into the adr member |
| Contact Postal Code | No | Extended | Grouped into the adr member |
| Contact Country | No | Extended | Grouped into the adr member |
| Contact Phone Number | No | Extended | tel with a type parameter voice |
| Contact Phone Number Ext | No | Extended | ext |
| Contact Fax | No | Extended | tel with a type parameter fax |
| Contact Fax Ext | No | Extended | ext |
| Contact Email | No | Private | email |

The figures below builds off FIG. 1 to present the flows through the components to satisfy an RDAP query. In general, the use of authentication and the use of the ID token with the authorization scheme determines the amount of data that the user will get. Applying the authorization policy is up to each RDAP service, which provides maximum flexibility to address many different authorization requirements.

Figure 2:
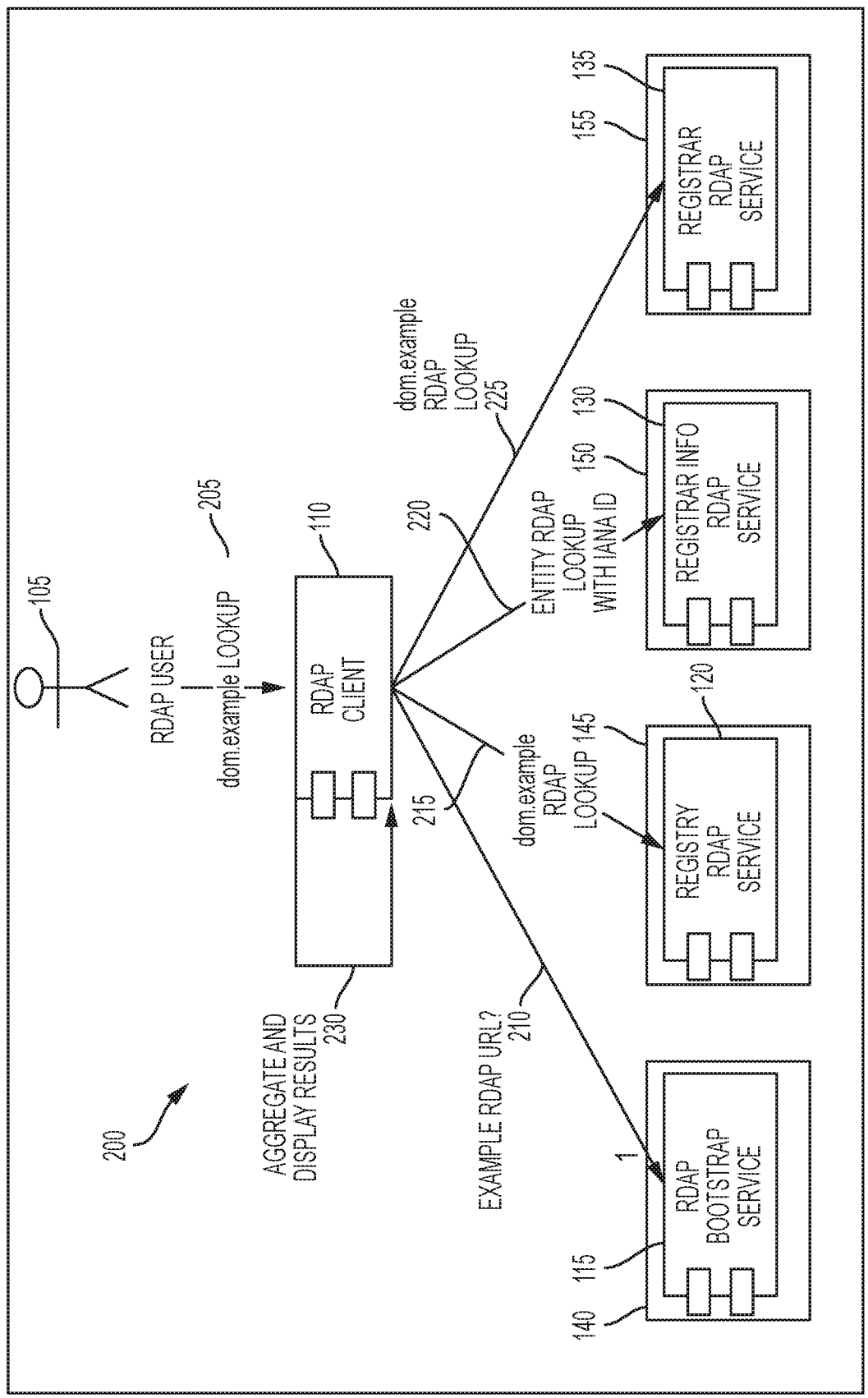
FIG. 2 shows a public (non-authentication) RDAP method of satisfying a domain lookup for the domain name "dom.example" and returning the public data available to non-authenticated users, according to examples of the present disclosure.

FIG. 2 shows a public (non-authentication) RDAP method of satisfying a domain lookup for the domain name "dom.example" and returning the public data available to non-authenticated users 200, according to examples of the present disclosure. The data returned does not include any private or Personally Identifiable Information (PII). At 205, RDAP user 105 accesses RDAP Client 110 and the user performs a lookup for the domain name "dom.example." At 210, RDAP client 110 locates the registry RDAP service 120 for "example" by querying RDAP bootstrap service 115. This information may be cached in RDAP client 110. At 215, RDAP client 110 sends an RDAP domain lookup for the domain name "dom.example", according to section 3.1.3 of RFC 7482, to registry RDAP service 120 for "example." The domain name and related name server fields returned are based on "Table 1—Domain Object Fields" and "Table 2—Name Server Object Fields", respectively. RDAP client 110 uses the registrar link field for the next step. At 220, RDAP client 110 sends an RDAP entity lookup for the registrar, leveraging the registrar link field defined in "Table 1—Domain Object Fields" to registrar info RDAP service 130. The "Public" registrar information is returned that includes the registrar RDAP link field for the next step. At 225, RDAP client 110 sends an RDAP domain lookup for the domain name "dom.example", according to section 3.1.3 of RFC 7482, to registrar RDAP service 135 defined by the registrar RDAP link field of 220. The "Public" domain name fields and related contact fields (registrant, admin, tech, billing) returned are based on "Table 5—Registrar Domain Object Fields" and "Table 6—Contact Object Fields." At 230, RDAP client 110 aggregates the information from the RDAP services and returns the query response to RDAP user 105.

Figure 3:
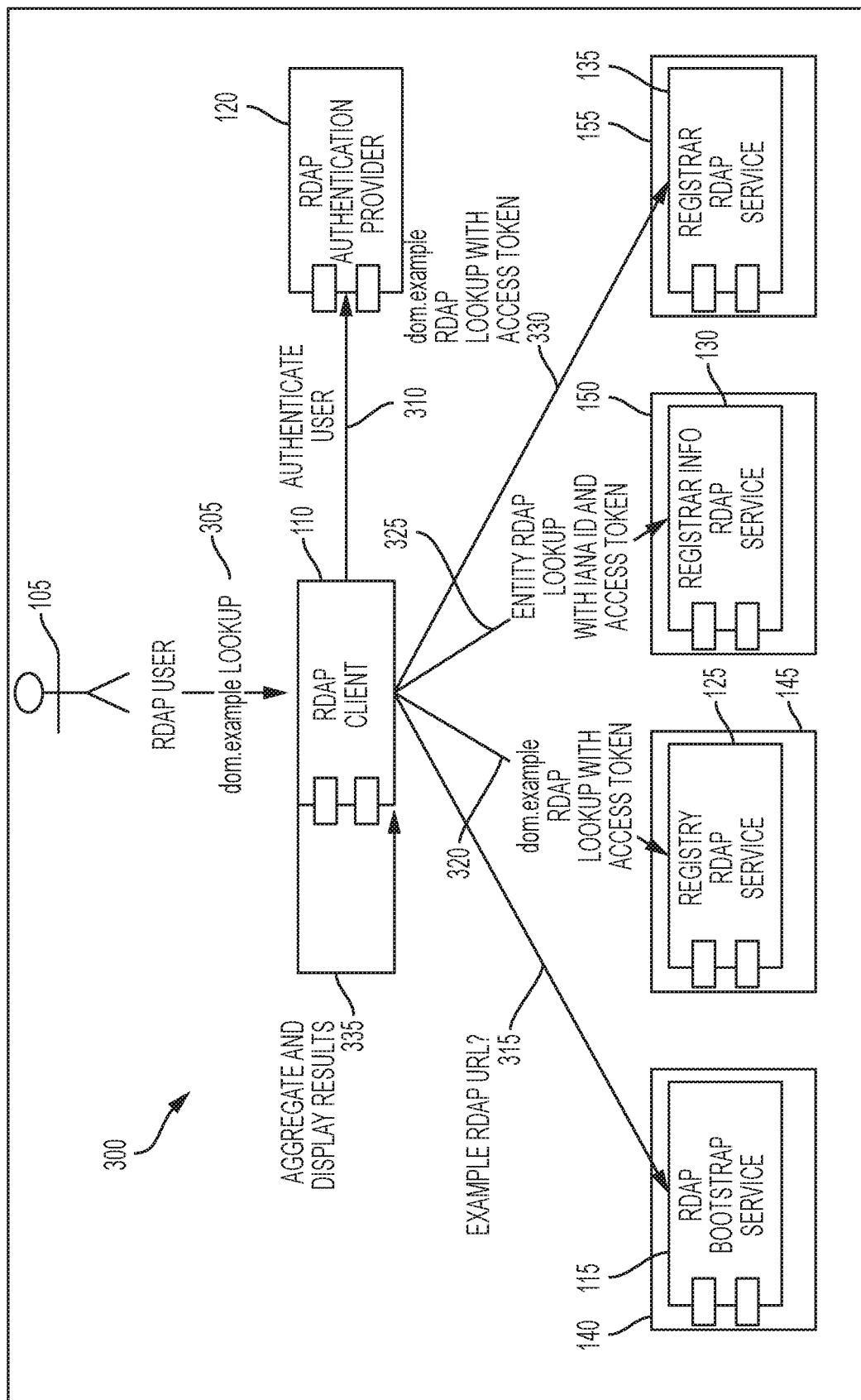
FIG. 3 shows an authenticated and authorized RDAP method of satisfying a domain lookup for the domain name "dom.example" that includes authentication via an RDAP Authentication Provider and authorization via RDAP services by passing an access token, according to examples of the present disclosure.

FIG. 3 shows an authenticated and authorized RDAP method of satisfying a domain lookup for the domain name "dom.example" that includes authentication via an RDAP Authentication Provider and authorization via RDAP services by passing the access token 300, according to examples of the present disclosure. The level of data available to the user is based on the contents of their access token. The data returned may include private or personally identifiable information ("PII") information. At 305, RDAP user 105 accesses RDAP Client 110 and the RDAP user 105 performs a lookup for the domain name "dom.example." At 310, RDAP client 110 authenticates RDAP user 105 with RDAP authentication provider 120. RDAP authentication provider 120 will generate and return the access token that is used by the RDAP services for authorization. At 315, RDAP client 110 locates registry RDAP service 125 for "example" by querying RDAP bootstrap service 115. This information may be cached in RDAP client 110. At 320, RDAP client 110 sends an RDAP domain lookup for the domain name "dom.example", according to section 3.1.3 of RFC 7482, to registry RDAP service 125 for "example" with the access token used for authorization. The domain name and related name server fields returned are based on "Table 1—Domain Object Fields" and "Table 2—Name Server Object Fields", respectively. RDAP client 110 uses the registrar link field for the next step. At 325, RDAP client 110 sends an RDAP entity lookup for the registrar, leveraging the registrar link field defined in "Table 1—Domain Object Fields" to the registrar info RDAP service 130 with the access token used for authorization. The registrar information is returned based on the access level defined in the access token that includes the registrar RDAP link field for the next step. At 330, RDAP client 110 sends an RDAP domain lookup for the domain name "dom.example", according to section 3.1.3 of RFC 7482, to the registrar RDAP service 135 defined by the registrar RDAP link field of 325. The domain name fields and related contact fields (registrant, admin, tech, billing) is returned based on the access level defined in the access token and based on the "Table 5—Registrar Domain Object Fields" and the "Table 6—Contact Object Fields". At 335, RDAP client 110 aggregates the information from the RDAP services and returns the query response to RDAP user 105.

Figure 4:
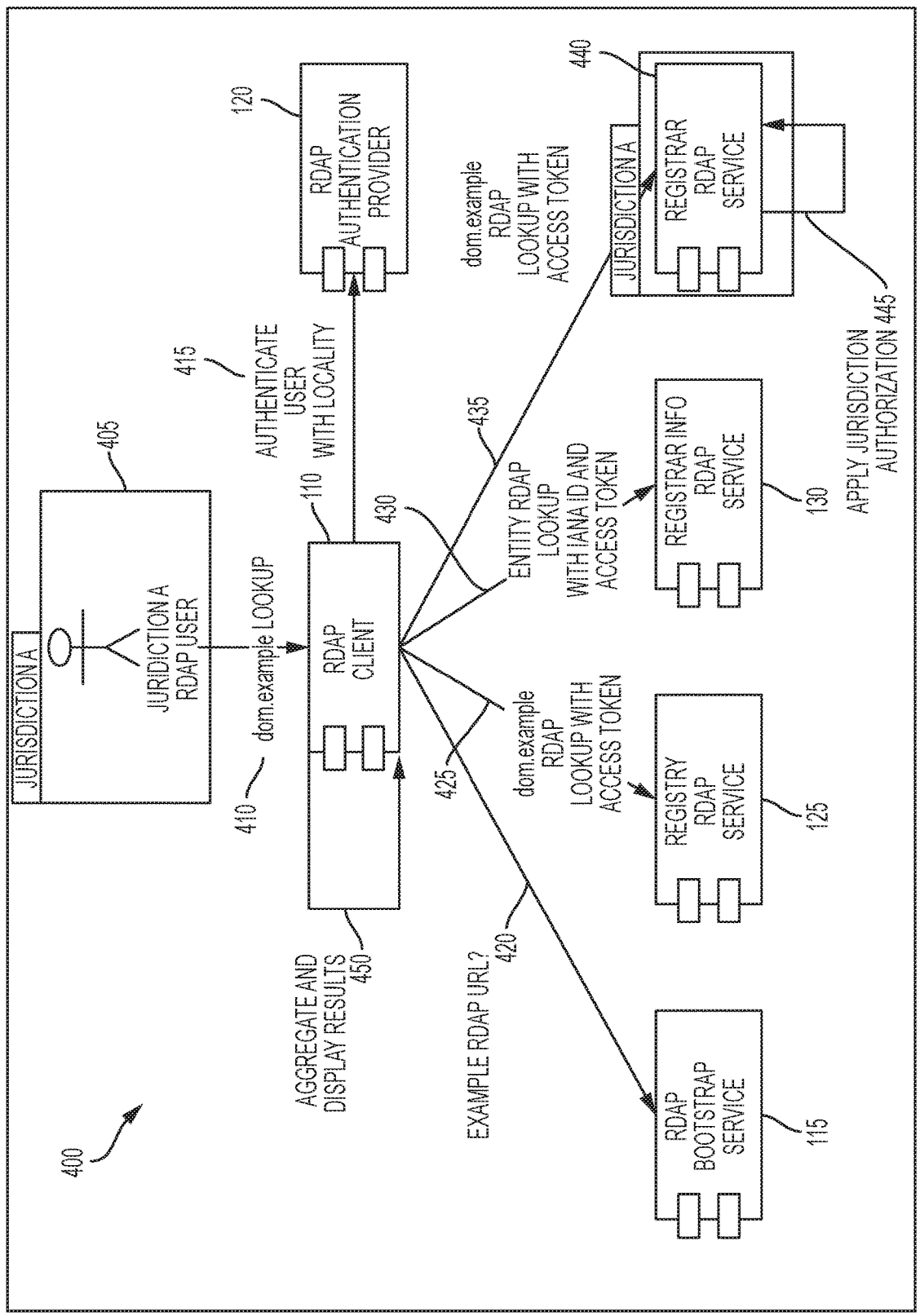
FIG. 4 shows intra-jurisdiction authorization RDAP method of satisfying a domain lookup for the domain name "dom.example" that applies jurisdiction-based authorization leveraging the locality (jurisdiction A) of the user, the nationality (jurisdiction A) of the user, and the location of the RDAP service (jurisdiction A), according to examples of the present disclosure.

FIG. 4 shows intra-jurisdiction authorization RDAP method of satisfying a domain lookup for the domain name "dom.example" that applies jurisdiction-based authorization leveraging the locality (jurisdiction A) of the user, the nationality (jurisdiction A) of the user, and the location of the RDAP service (jurisdiction A) 400, according to examples of the present disclosure. Since the locality, nationality, and service location reside within the same jurisdiction, it is expected that the user will receive more data than if the jurisdictions did not match. At 410, jurisdiction A RDAP user 405 accesses RDAP client 110 from within jurisdiction A where RDAP user 405 performs a lookup for the domain name "dom.example." At 415, RDAP client 110 authenticates jurisdiction A RDAP user 405 with RDAP authentication provider 120 with the inclusion of the user's locality. RDAP authentication provider 120 will generate and return the access token with the locality and nationality of jurisdiction A RDAP user 405 that is used by the RDAP services for authorization. At 420, RDAP client 110 locates registry RDAP service 125 for "example" by querying RDAP bootstrap service 115. This information may be cached in RDAP Client 110. At 425, RDAP client 110 sends an RDAP domain lookup for the domain name "dom.example", according to section 3.1.3 of RFC 7482, to the registry RDAP service 125 for "example" with the access token used for authorization. The domain name and related name server fields returned are based on "Table 1—Domain Object Fields" and "Table 2—Name Server Object Fields", respectively. RDAP client 110 uses the registrar link field for 430. At 430, RDAP client 110 sends an RDAP entity lookup for the registrar, leveraging the registrar link field defined in "Table 1—Domain Object Fields" to registrar info RDAP service 130 with the access token used for authorization. The registrar information is returned based on the access level defined in the access token that includes the registrar RDAP link field for 435. At 435, RDAP client 110 sends an RDAP domain lookup for the domain name "dom.example", according to section 3.1.3 of RFC 7482, to the Registrar RDAP Service defined by the Registrar RDAP Link field of 430. At 445, registrar RDAP service 440 will apply the jurisdiction authorization that shows that the user's locality, the user's nationality, and the service's location all are in jurisdiction A. The domain name fields and related contact fields (registrant, admin, tech, billing) is returned based on the jurisdiction authorization policy, which is expected to be more than if the jurisdictions did not match. At 450, RDAP client 110 aggregates the information from the RDAP services and returns the query response to jurisdiction A RDAP user 405.

Figure 5:
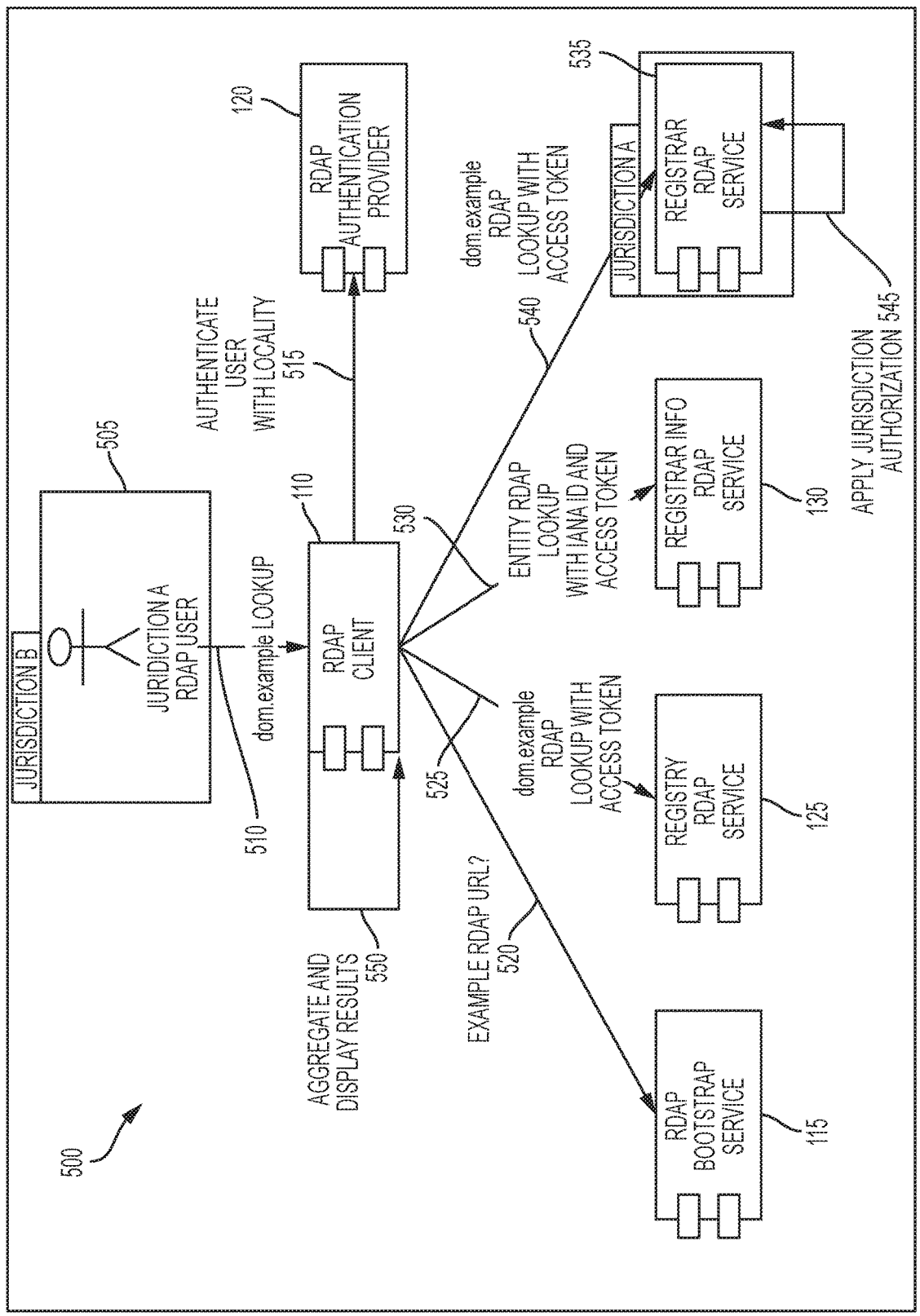
FIG. 5 shows inter-jurisdiction authorization RDAP method of satisfying a domain lookup for the domain name "dom.example" that applies jurisdiction-based authorization leveraging the locality (jurisdiction B) of the user, the nationality (jurisdiction A) of the user, and the location of the RDAP service (jurisdiction A), according to examples of the present disclosure.

FIG. 5 shows inter-jurisdiction authorization RDAP method of satisfying a domain lookup for the domain name "dom.example" that applies jurisdiction-based authorization leveraging the locality (jurisdiction B) of the user, the nationality (jurisdiction A) of the user, and the location of the RDAP service (jurisdiction A) 500, according to examples of the present disclosure. Since the locality, nationality, and service location don't reside within the same jurisdiction, it is expected that the user will receive less data than if the jurisdictions did match. At 510, jurisdiction A RDAP user 505 accesses RDAP client 110 from within jurisdiction B where jurisdiction A RDAP user 505 performs a lookup for the domain name "dom.example." At 515, RDAP client 110 authenticates the jurisdiction A RDAP user 505 with RDAP authentication provider 120 with the inclusion of the user's locality. RDAP authentication provider 120 will generate and return the access token with the locality and nationality of the jurisdiction A RDAP user 505 that is used by the RDAP Services for authorization. At 520, RDAP client 110 locates registry RDAP service 125 for "example" by querying RDAP bootstrap service 115. This information may be cached in RDAP client 110. At 525, RDAP client 110 sends an RDAP domain lookup for the domain name "dom.example", according to section 3.1.3 of RFC 7482, to registry RDAP service 125 for "example" with the access token used for authorization. The domain name and related name server fields returned are based on "Table 1—Domain Object Fields" and "Table 2—Name Server Object Fields", respectively. RDAP client 110 uses the registrar link field for 530. At 530, RDAP client 110 sends an RDAP entity lookup for the registrar, leveraging the registrar link field defined in "Table 1—Domain Object Fields" to registrar info RDAP service 130 with the access token used for authorization. The registrar information is returned based on the access level defined in the access token that includes the registrar RDAP link field for 540. At 540, RDAP client 110 sends an RDAP domain lookup for the domain name "dom.example", according to section 3.1.3 of RFC 7482, to the registrar RDAP service defined by the registrar RDAP link field of 530. At 545, registrar RDAP service 535 will apply the jurisdiction authorization that shows that the user's locality is different from the user's nationality and the service's location. The domain name fields and related contact fields (registrant, admin, tech, billing) is returned based on the jurisdiction authorization policy, which is expected to be less than if the jurisdictions did match. At 550, RDAP client 110 aggregates the information from the RDAP services and returns the query response to jurisdiction A RDAP user 505.

Figure 6:
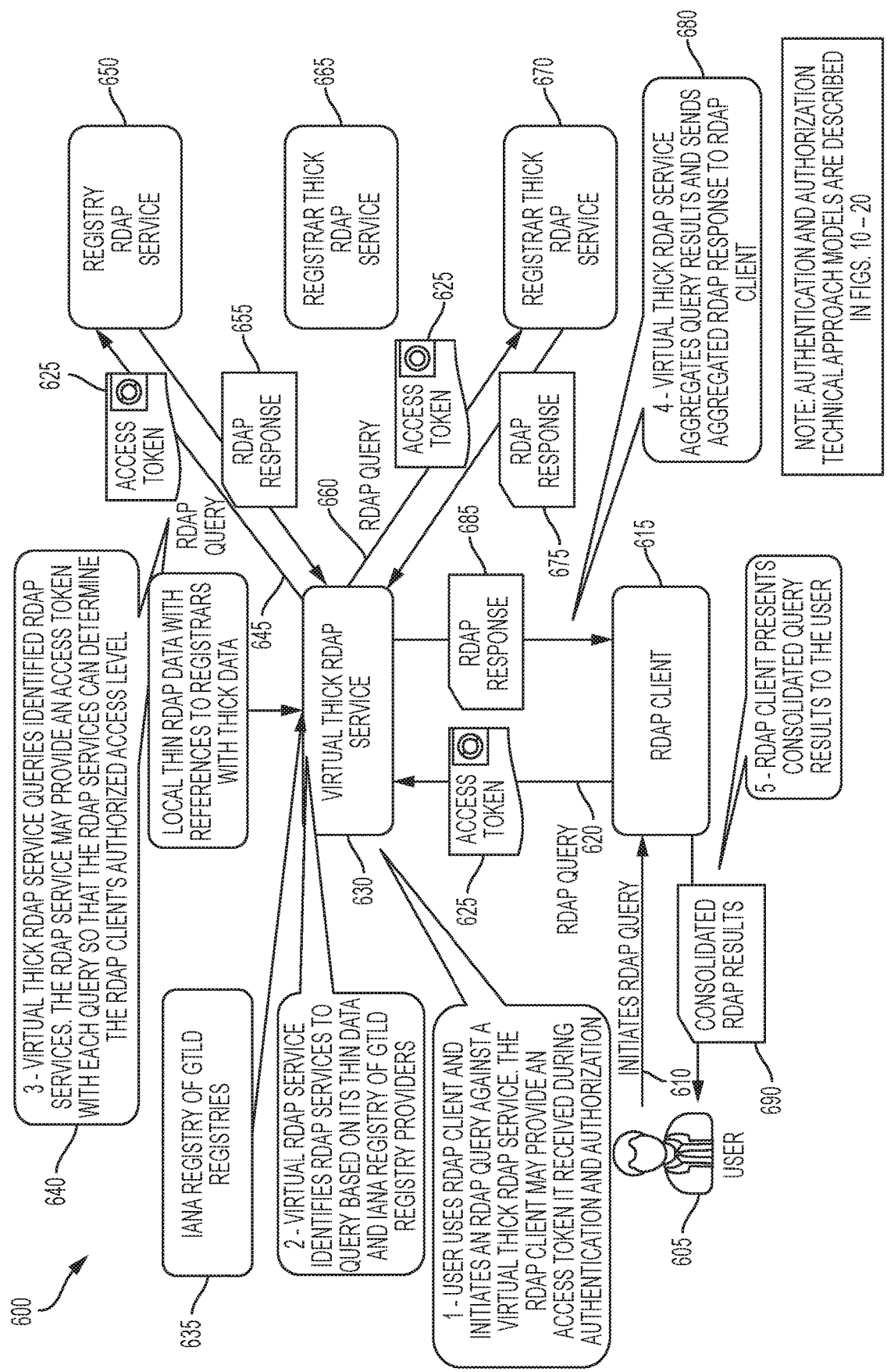
FIG. 6 shows a RDAP query resolution process using virtual thick RDAP service, according to examples of the present disclosure.

FIG. 6 shows a RDAP query resolution process using virtual thick RDAP service 600, according to examples of the present disclosure. The virtual thick RDAP service is a thin service that provides a RDAP user the appearance of a thick service by performing additional processing with other RDAP services that are transparent to the RDAP user. The process beings by RDAP user 605 initiating a RDAP query 610 to RDAP client 615. RDAP client 615 sends RDAP query 620 with access token 625 provided by a RDAP authentication provider (not shown), such as RDAP authentication provider 120, to virtual thick RDAP service 630. Virtual thick RDAP service 630 provides local thin RDAP data with references to registrars with thick data. Virtual thick RDAP service 630 identifies RDAP services to query based on its thin data and IANA registry of gTLD registry providers 635. Virtual thick RDAP service 630 queries identified RDAP services, i.e., registry RDAP service 650, registrar thick RDP service 665, registrar thick RDAP service 670, and may provide access token 625 with each query so that the RDAP services can determine the authorized access level of RDAP client 615. In this example, virtual thick RDAP service 630 provides RDAP query 645 optionally with access token 625 to registry RDAP service 650 and receives RDAP response 655 and provides RDAP query 660 optionally with access token 625 to registrar thick RDAP service 670 and receives RDAP response 675. Based on the RDAP responses from the identified RDAP services, virtual thick RDAP service 630 aggregates query results 680 and send aggregated RDAP response 685 to RDAP client 615. RDAP client 615 presents consolidated query results 690 to RDAP user 605.

Figure 7:
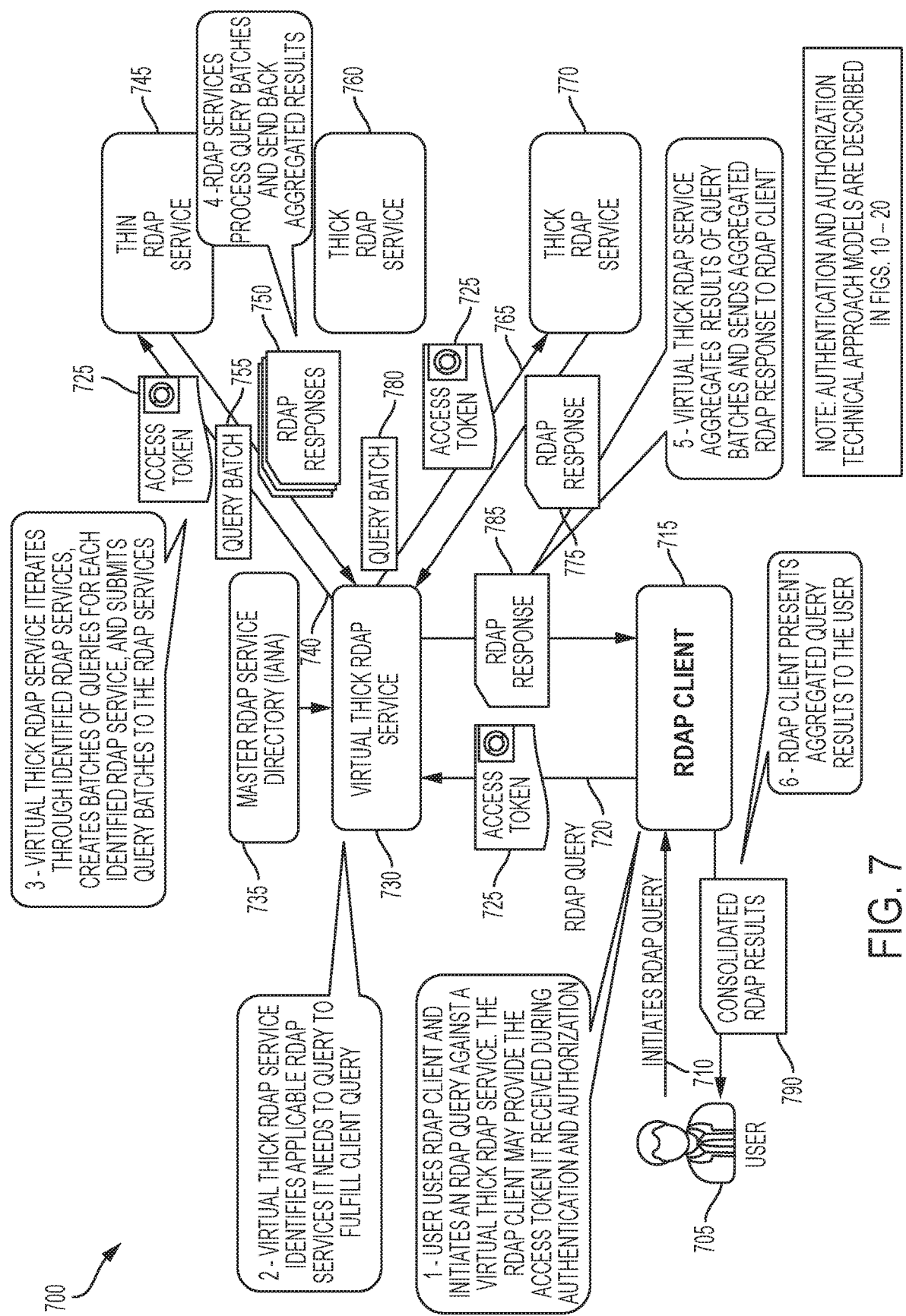
FIG. 7 shows a RDAP query resolution process using virtual thick RDAP service with a query batching feature, according to examples of the present disclosure.

FIG. 7 shows a RDAP query resolution process using virtual thick RDAP service with a query batching feature 700, according to examples of the present disclosure. The virtual thick RDAP service is a thin service that provides a RDAP user the appearance of a thick service by performing additional processing with other RDAP services that are transparent to the RDAP user. The process beings by RDAP user 705 initiating a RDAP query 710 to RDAP client 715. RDAP client 715 sends RDAP query 720 with access token 725 provided by a RDAP authentication provider (not shown), such as RDAP authentication provider 120, to virtual thick RDAP service 730. Virtual thick RDAP service 730 provides local thin RDAP data with references to registrars with thick data. Virtual thick RDAP service 730 identifies RDAP services to query based on its thin data and IANA registry of gTLD registry providers 735. Virtual thick RDAP service 730 iterates through identified RDAP services, i.e., thin RDAP service 745, thick RDP service 760, thick RDAP service 770, and creates batches of queries for each identified RDAP service submits query batches to the RDAP service, and may provide access token 725 with each query batch so that the RDAP services can determine the authorized access level of RDAP client 715. The identified RDAP services process the query batches and send back aggregated results to virtual thick RDAP service 730. In this example, virtual thick RDAP service 730 provides RDAP query batch 755 optionally with access token 725 to thin RDAP service 745 and receives RDAP response 750 and provides RDAP query batch 765 optionally with access token 725 to thick RDAP service 770 and receives RDAP response 775. Based on the RDAP responses from the identified RDAP services, virtual thick RDAP service 730 aggregates results of query batches and send aggregated RDAP response 785 to RDAP client 715. RDAP client 715 presents aggregated query results 790 to RDAP user 705.

Figure 8:
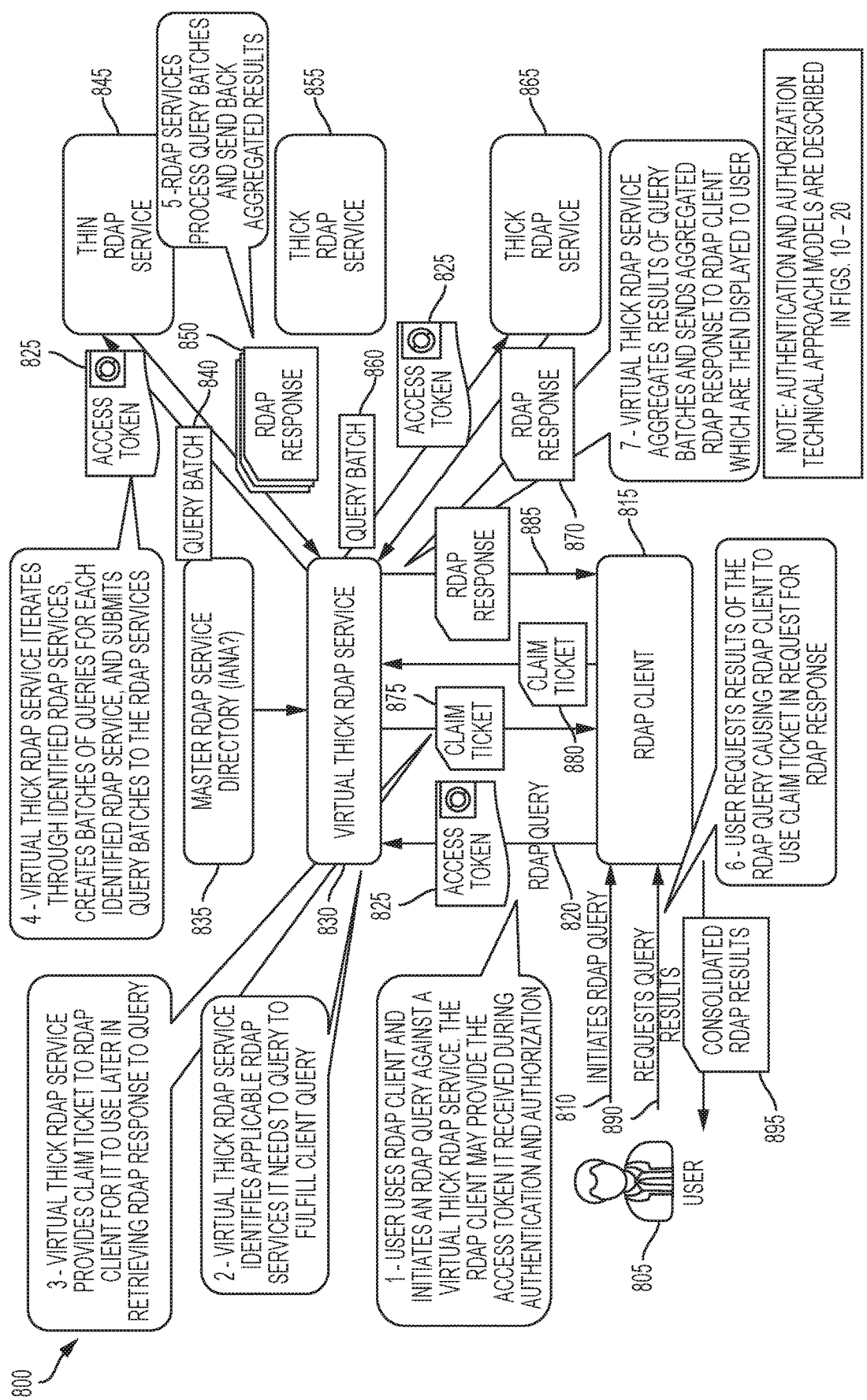
FIG. 8 shows a RDAP query resolution process using virtual thick RDAP service with query batching and claim ticket feature, according to examples of the present disclosure.

FIG. 8 shows a RDAP query resolution process using virtual thick RDAP service with query batching and claim ticket feature 800, according to examples of the present disclosure. The virtual thick RDAP service is a thin service that provides a RDAP user the appearance of a thick service by performing additional processing with other thick RDAP service that are transparent to the RDAP user. The process beings by RDAP user 805 initiating a RDAP query 810 to RDAP client 815. RDAP client 815 sends RDAP query 820 with access token 825 provided by a RDAP authentication provider (not shown), such as RDAP authentication provider 120, to virtual thick RDAP service 830. Virtual thick RDAP service 830 provides local thin RDAP data with references to registrars with thick data. Virtual thick RDAP services 830 identifies RDAP services to query based on its thin data and IANA registry of gTLD registry providers 835. In this example, virtual thick RDAP service 830 provides claim ticket 875 to RDAP client 815 for it to use later in retrieving RDAP response 885 to RDAP query 810. Virtual thick RDAP service 830 iterates through identified RDAP services, i.e., thin RDAP service 845, thick RDP service 855, thick RDAP service 865, and creates batches of queries for each identified RDAP service submits query batches to the RDAP service, and may provide access token 825 with each query batch so that the RDAP services can determine the authorized access level of RDAP client 815. The identified RDAP services process the query batches and send back aggregated results to virtual thick RDAP service 830. In this example, virtual thick RDAP service 830 provides RDAP query batch 840 optionally with access token 825 to thin RDAP service 845 and receives RDAP response 850 and provides RDAP query batch 860 optionally with access token 825 to thick RDAP service 865 and receives RDAP response 870. Based on the RDAP responses from the identified RDAP services and a user request for results of the RDAP query that causes RDAP client 815 to use claim ticket 880 in request for RDAP response 890, virtual thick RDAP service 830 aggregates results of query batches and send aggregated RDAP response 885 to RDAP client 815. RDAP client 815 presents aggregated query results 895 to RDAP user 805.

Figure 9:
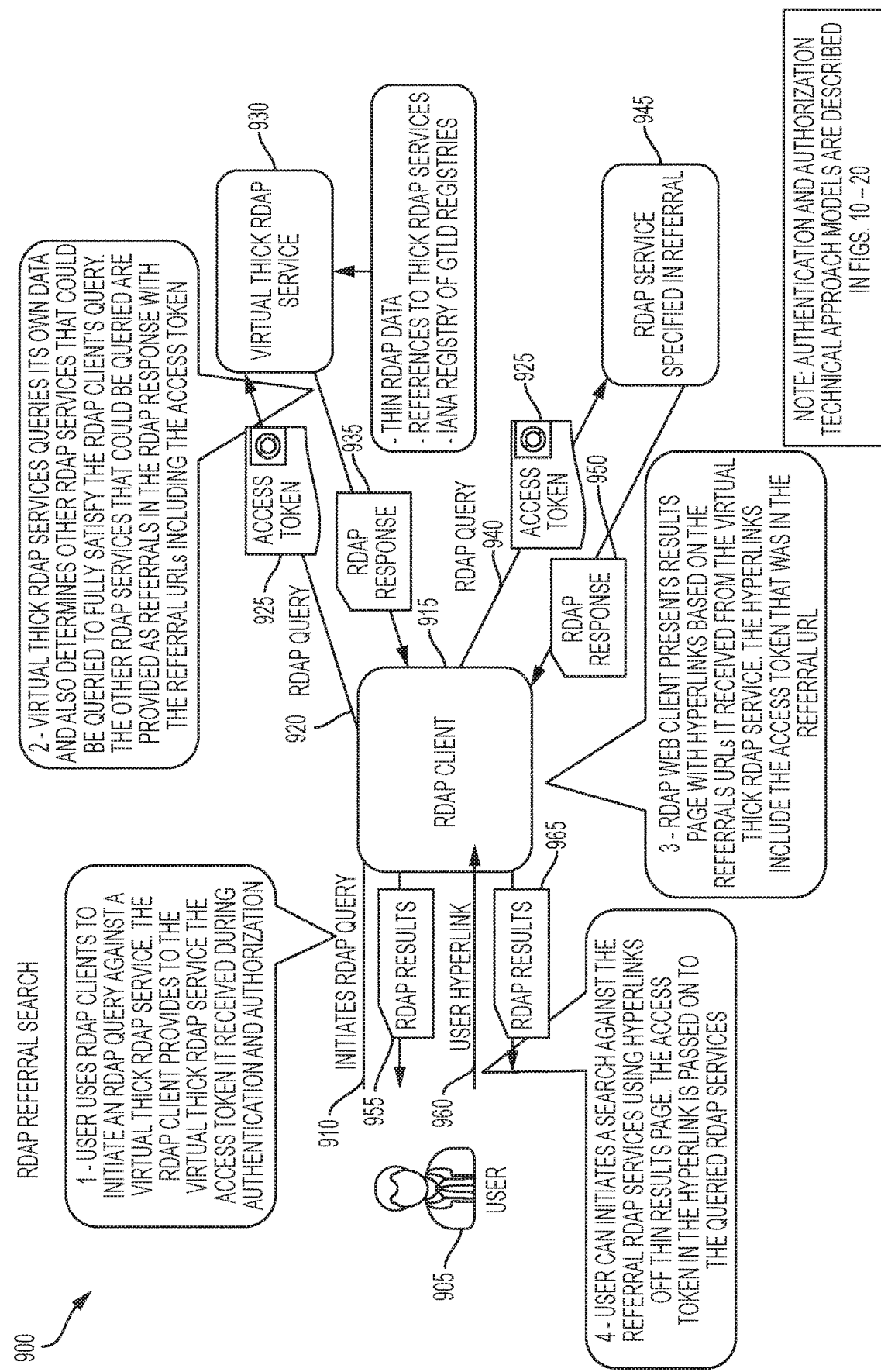
FIG. 9 shows a RDAP referral search process, according to examples of the present disclosure.

FIG. 9 shows a RDAP referral search process 900, according to examples of the present disclosure. RDAP user 905 initiates RDAP query 910 against virtual thick RDAP service 930 to RDAP client 915. RDAP client 915 provides RDAP query 920 with access token 925 to virtual thick RDAP service 930 that it receives during the authentication and authorization process using RDAP authentication provider 120. Virtual thick RDAP service 930 queries its own data and also determines other RDAP services, such as references to thick RDAP services and LANA registry of gTLD registries, that could be queried to fully satisfy RDAP query 910. Virtual thick RDAP service 930 then provides RDAP response 935 to RDAP client 915. RDAP client 915 presents results page with hyperlinks 955 based on referral URLs it received from virtual thick RDAP service 930. The hyperlinks include access token 925 that was in the referral URL. RDAP user 905 initiates a search 960 against the referral RDAP services using the hyperlinks off the thin results page. Access token 925 in the hyperlinks is passed on to the queried RDAP services. RDAP client 915 provides initiates RDAP query 940 based on the search 960 along with access token 925 to RDAP service specified in referral 945 and returns RDAP response 950. RDAP client 915 then returns the RDAP results 965 to RDAP user 905.

Figure 10:
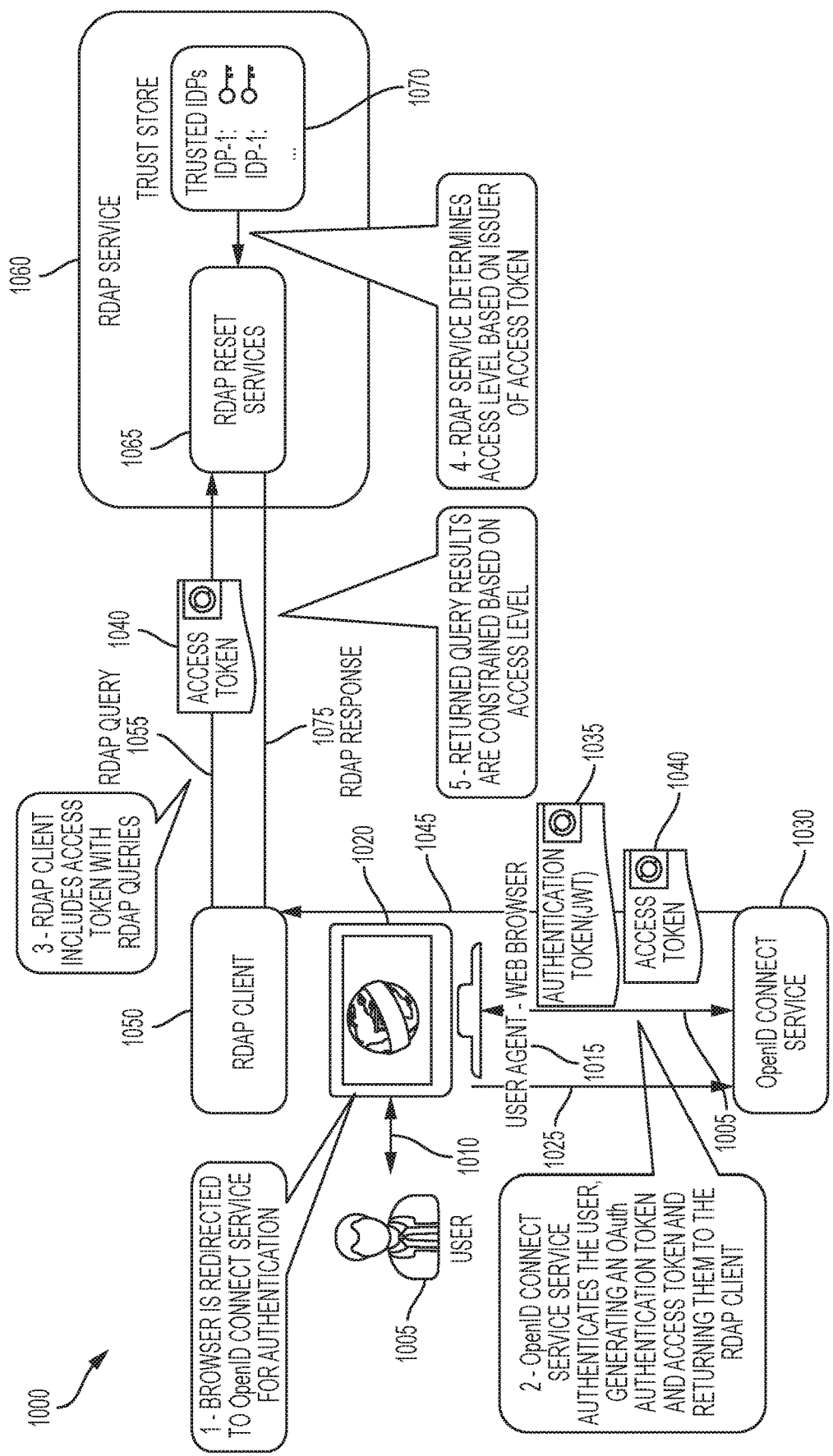
FIG. 10 shows a RDAP resolution process using aRDAP authentication and authorization service, according to examples of the present disclosure.

FIG. 10 shows a RDAP resolution process using a RDAP authentication and authorization service 1000, according to examples of the present disclosure. RDAP authentication and authorization service determines the access level to grant to an RDAP client based on an identity associated with it and authorizations granted to that identity. Example access levels include the following: minimal, for unauthenticated clients, that provides privacy shield against unknown entities mining RDAP services; medium, equivalent to thick WHOIS, for authenticated clients not associated with an organization that has been granted privileged access; and privileged, can penetrate past privacy services, which is for authenticated clients that are associated with an organization that has been granted privileged access. Medium and privileged access could require a trust relationship between authorization service and IDP. RDAP user 1005 initiates a RDAP query 1010 using a user agent in the form of a web browser 1015 on a client computer 1020. Web browser 1015 is then redirected 1025 to OpenID Connect service 1030. OpenID Connect service 1030 authenticates RDAP client 1005 and generates an OAuth authentication token 1035 and access token 1040 and returns them 1045 to RDAP client 1050. RDAP client 1050 initiates RDAP query 1055 including access token 1040 to RDAP service 1060. RDAP service 1060 includes RDAP REST services 1065 that interfaces with RDAP client 1050 and trust store 1070 that stores access permissions for one or more RDAP users 1005. RDAP service 1060 determines access levels based on issuer of access token 1040. RDAP service 1060 returns, via RDAP REST services 1065, query results 1075 to RDAP client 1050 that are constrained based on access level of access token 1040. RDAP client 1050 then returns the query result to RDAP user 1005.

Figure 11:
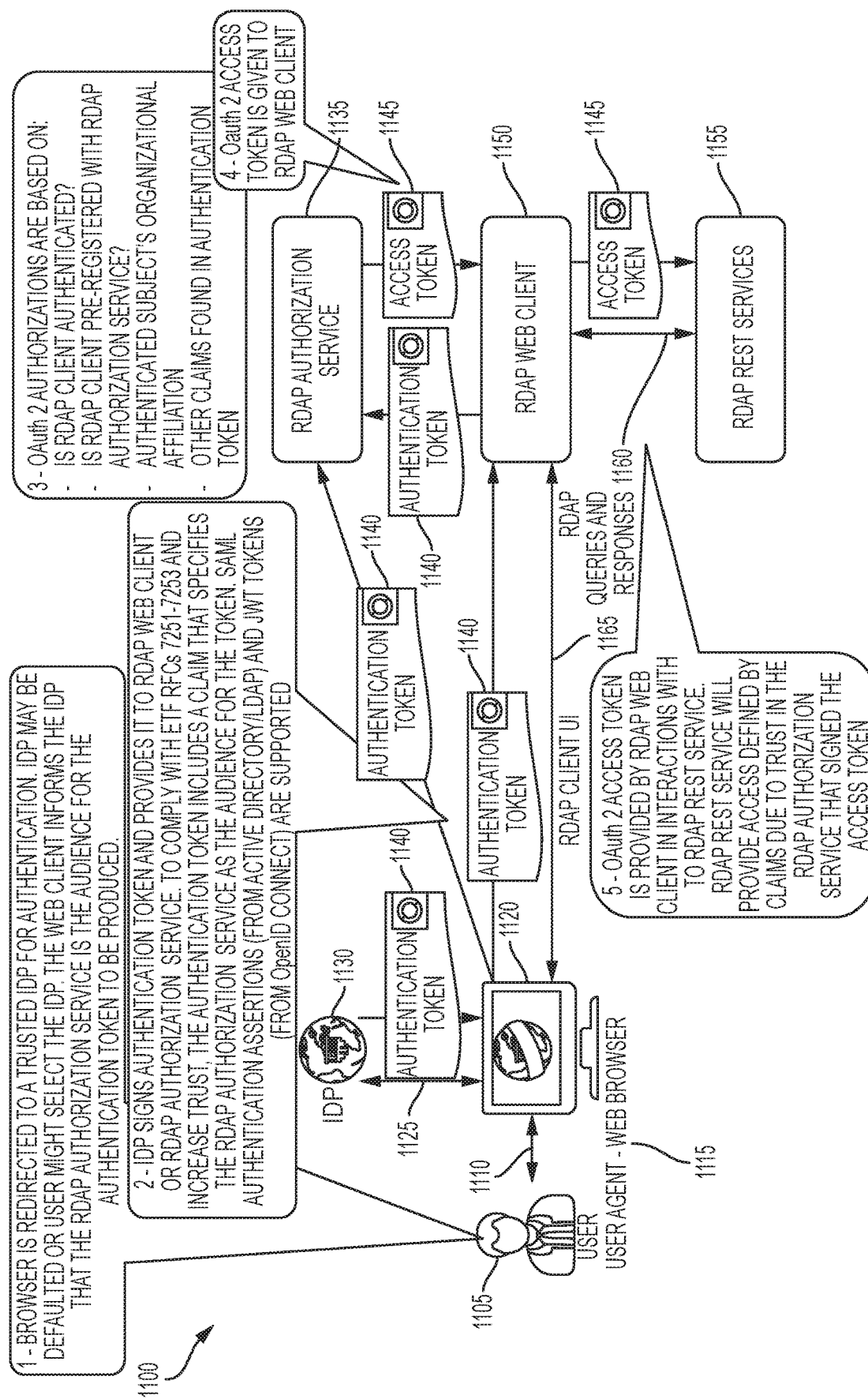
FIG. 11 shows another RDAP resolution process using a centralized RDAP authentication and authorization service, according to examples of the present disclosure.

FIG. 11 shows another RDAP resolution process using an RDAP authentication and authorization service 1100, according to examples of the present disclosure. RDAP user 1105 initiates a RDAP query 1110 using a user agent in the form of a web browser 1115 on a client computer 1120. Web browser 1115 is then redirected 1125 to trusted identity provider ("IDP") 1130, which is a service that authenticates a client via a user interaction, for authentication. IDP 1130 may be defaulted or the user agent may select IDP 1130. The user agent informs the IDP 1130 that the RDAP authorization service 1135 is the audience for authentication token 1140 to be produced. IDP 1130 digitally signs authentication token 1140 and provides it to the user agent or RDAP authorization service 1135. Authentication token 1140 can include a claim that specifies RDAP authorization service 1135 as the audience for authentication token 1140. SAML authentication assertions from Active Directory/lightweight directory access protocol ("LDAP") and JSON web tokens ("JWT tokens") from OpenID Connect can be used. OAuth 2 authorization are based on one or more of the following elements: (1) is RDAP client authenticated?; (2) is RDAP client pre-registered with RDAP authorization services?: (3) authenticated subject's organizational affiliation; and (4) other claims found in authentication token 1140. RDAP authorization service 1135 provides OAuth 2 access token 1145 to RDAP web client 1050. OAuth 2 access token 1145 is provided by RDAP web client 1150 in interactions with RDAP REST service 1155. RDAP REST service 1155 provides access defined by the claims due to the trust in RDAP authorization service 1135 that digitally signed access token 1145. RDAP query results 1165 are provided to RDAP user 1105 by RDAP web client 1150.

Figure 12:
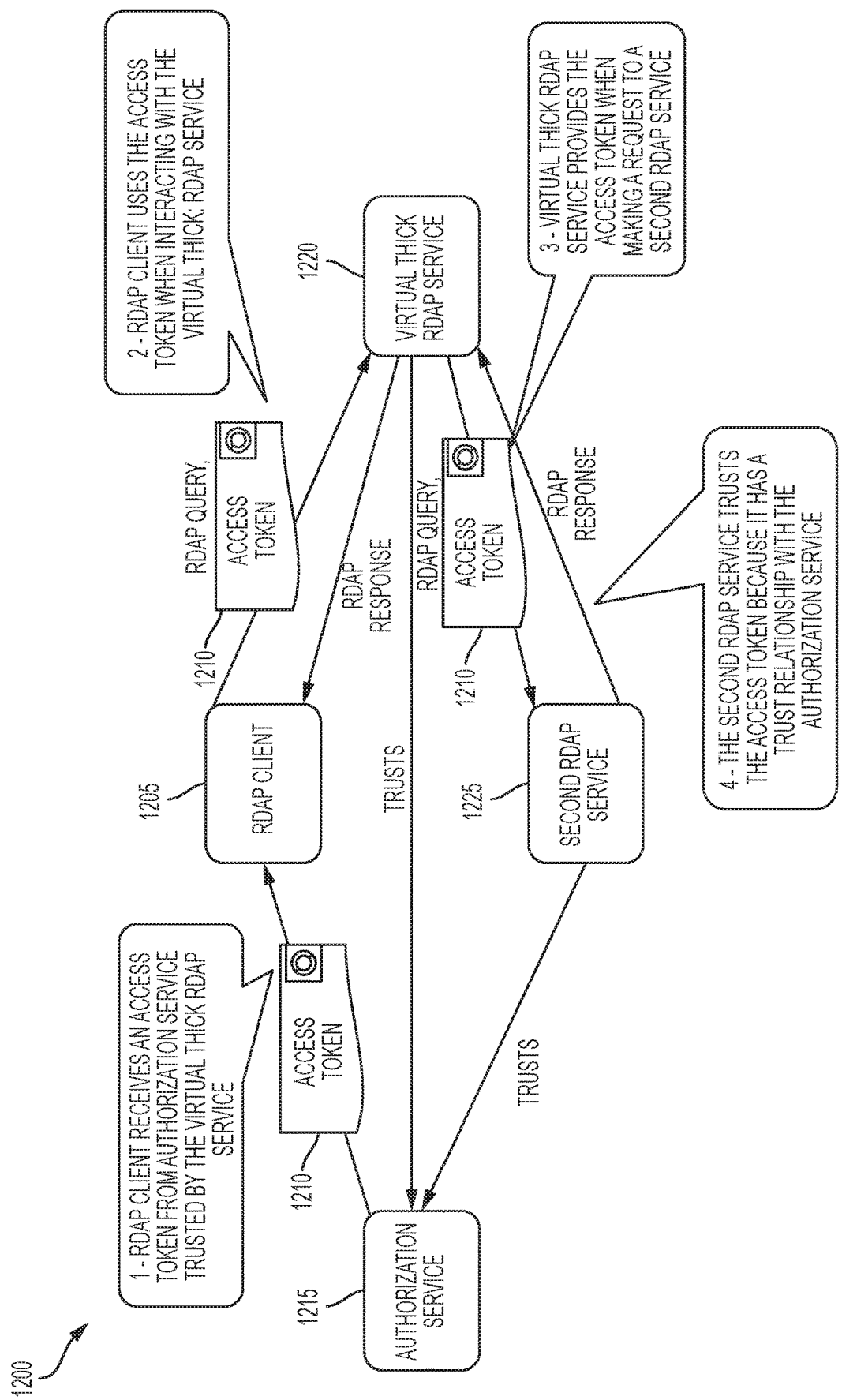
FIG. 12 shows a trust relation between RDAP entities using a second RDAP service, according to examples of the present disclosure.

FIG. 12 shows a trust relation between RDAP entities using a second RDAP service 1200, according to examples of the present disclosure. RDAP client 1205 receives access token 1210 from authorization service 1215 trusted by virtual thick RDAP service 1220. RDAP client 1205 uses access token 1210 when interacting with virtual thick RDAP servicem 1220. Virtual thick RDAP service 1220 provides access token 1210 when making a request to second RDAP service 1225. Second RDAP service 1225 trusts access token 1210 because it has a trust relationship with authorization service 1215.

Figure 13:
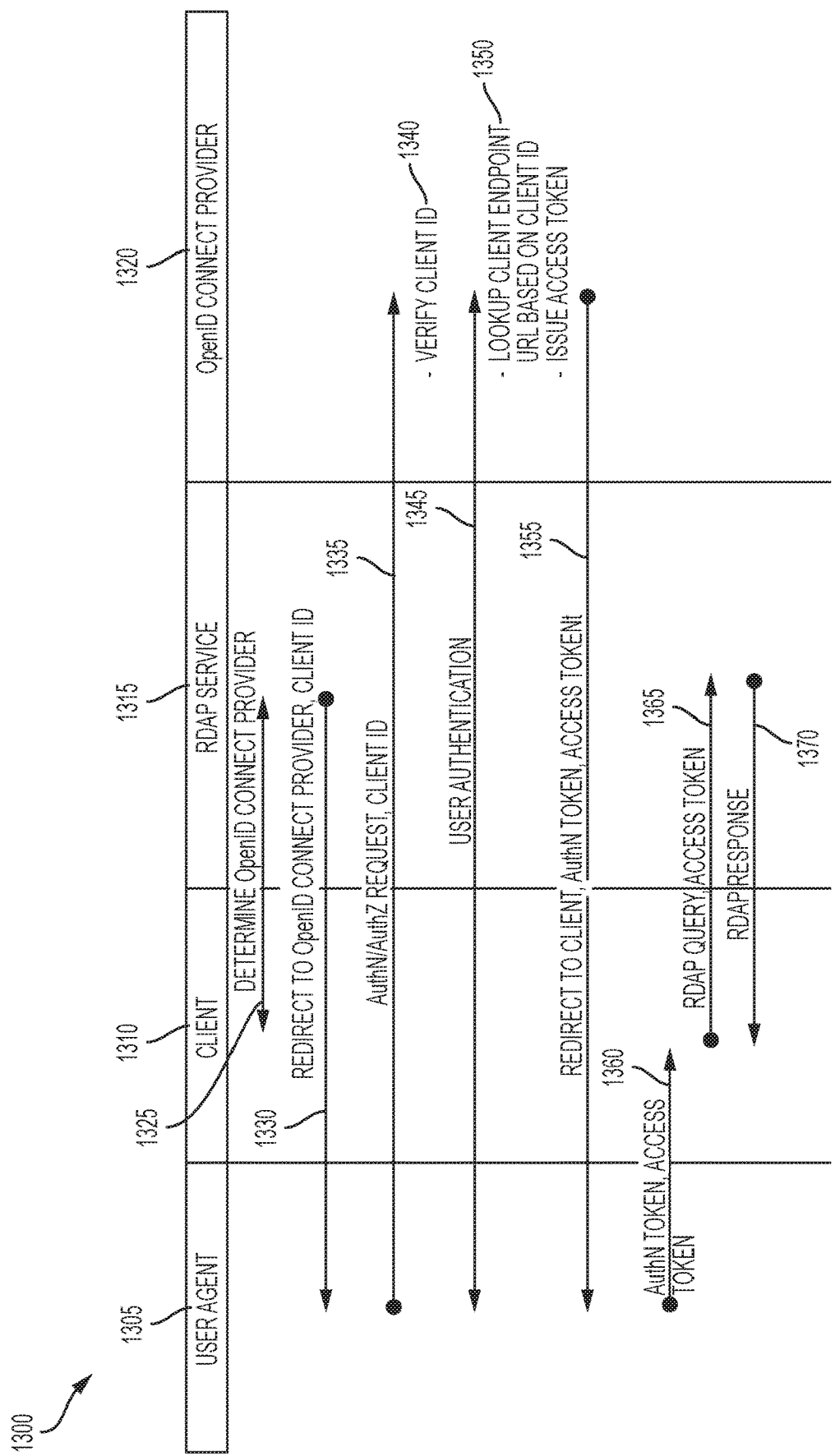
FIG. 13 shows a process flow between RDAP entities, according to examples of the present disclosure.

FIG. 13 shows a process flow between RDAP entities 1300, according to examples of the present disclosure. At 1325, RDAP service 1315 determines and provides an OpenID Connect provider to client 1310. At 1330, RDAP service 1315 provides a redirect for OpenID Connect provider with a client ID to user agent 1305. User agent 1305 provides an authorization/authentication request with the client ID to OpenID Connect provider 1320, where OpenID Connect provider 1320 verifies the client ID at 1340. At 1345, OpenID Connect provider 1320 provides user authentication 1345 to user agent 1305. At 1350, OpenID Connect provider 1320 performs a lookup client endpoint URL based on the client ID and issues an access token. At 1355, OpenID Connect provider 1320 provides a redirect, authentication token, and access token for client 1310 to user agent 1305. At 1360, user agent 1305 provides authentication token and access token to client 1310. At 1365, client 1310 initiates a RDAP query with the access token to RDAP service 1315. At 1370, RDAP service 1315 provides a RDAP response to client 1310.

Figure 14A:
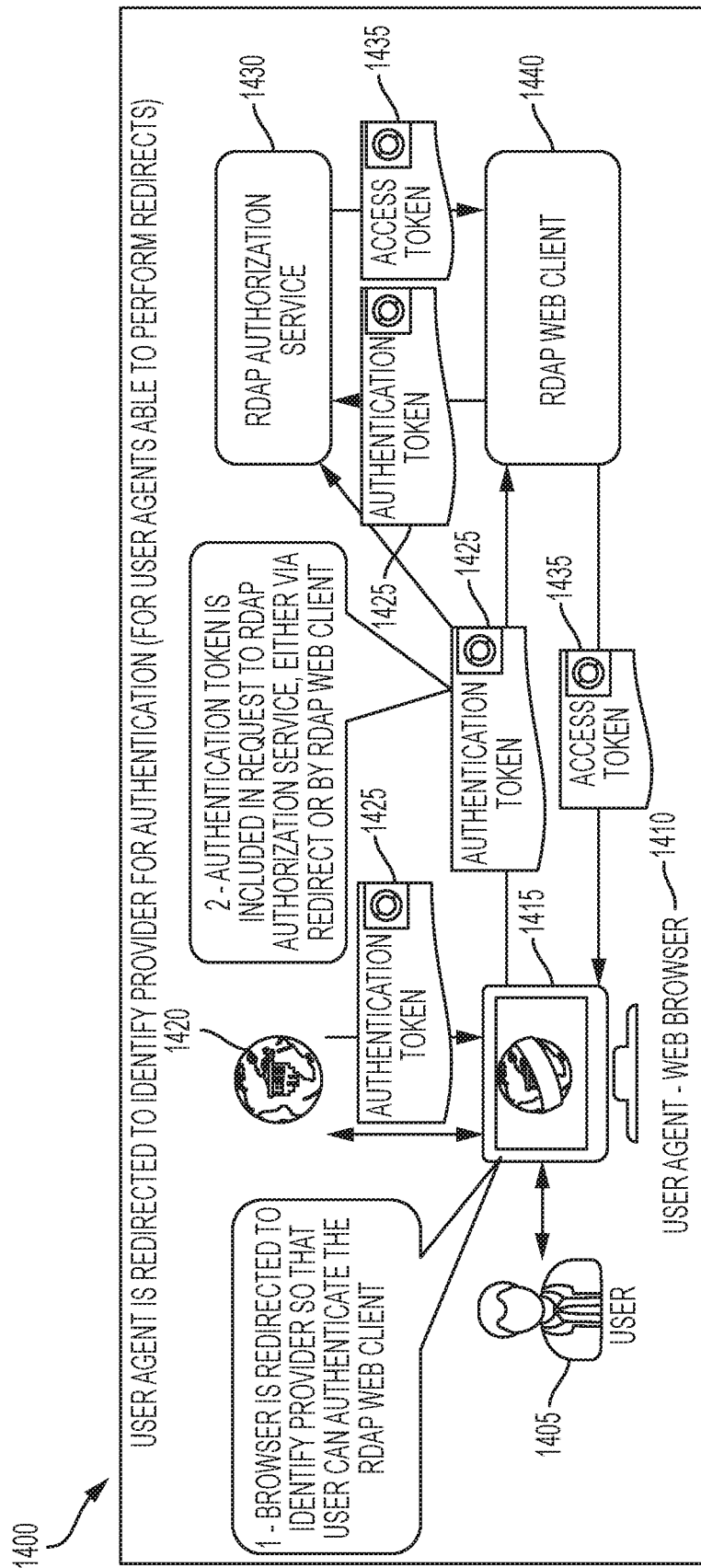
FIG. 14A shows a process where a user agent is redirected to IDP for authentication, according to examples of the present disclosure.

FIG. 14A shows a process where a user agent is redirected to IDP for authentication 1400, according to examples of the present disclosure. RDAP user 1405 initiates a RDAP query with user agent 1410, such as a web browser, on client computer 1415. User agent 1410 is redirected to IDP 1420 so that RDAP user 1405 can authenticate RDAP web client 1440. IDP 1420 generates authentication token 1425, which is included in a request to RDAP authorization service 1430, either via a redirect or by RDAP web client 1440. RDAP web client 1440 provides authentication token 1425 to RDAP authorization service 1430 and receives access token 1435. RDAP web client 1440 then provides access token 1435 to user agent 1410.

Figure 14B:
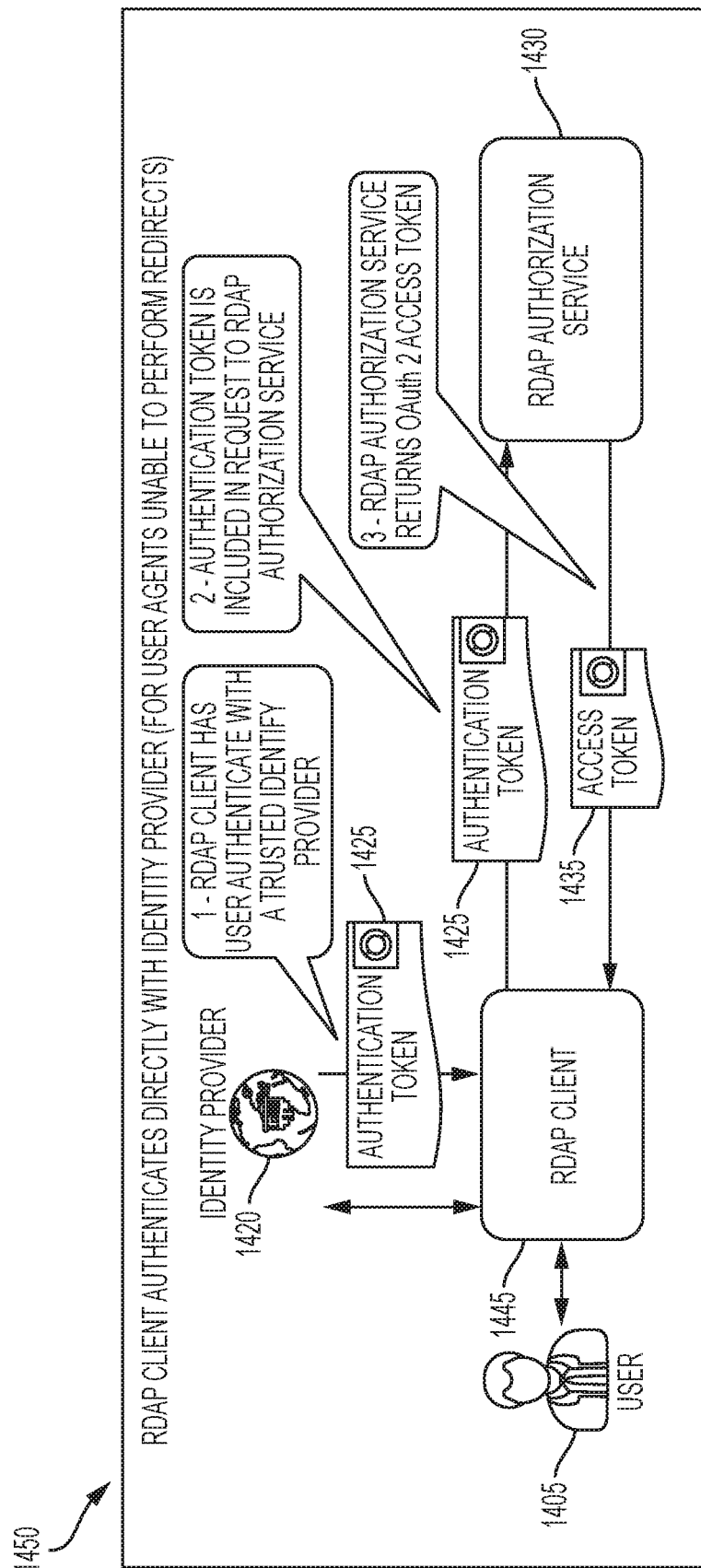
FIG. 14B shows a process where RDAP client authenticates directly with IDP, according to examples of the present disclosure.

FIG. 14B shows a process where RDAP client authenticates directly with IDP 1450, according to examples of the present disclosure. RDAP user 1405 initiates a RDAP query with RDAP client 1445, which has RDAP user 1405 authenticate with a trusted identify provider, such as IDP 140. IDP 1420 generates and provides authentication token 1425 to RDAP client 1445. Authentication token 1425 is included in a request to RDAP authorization service 1430. RDAP authorization service 1430 returns OAuth 2 access token 1435 to RDAP client 1445.

Figure 15:
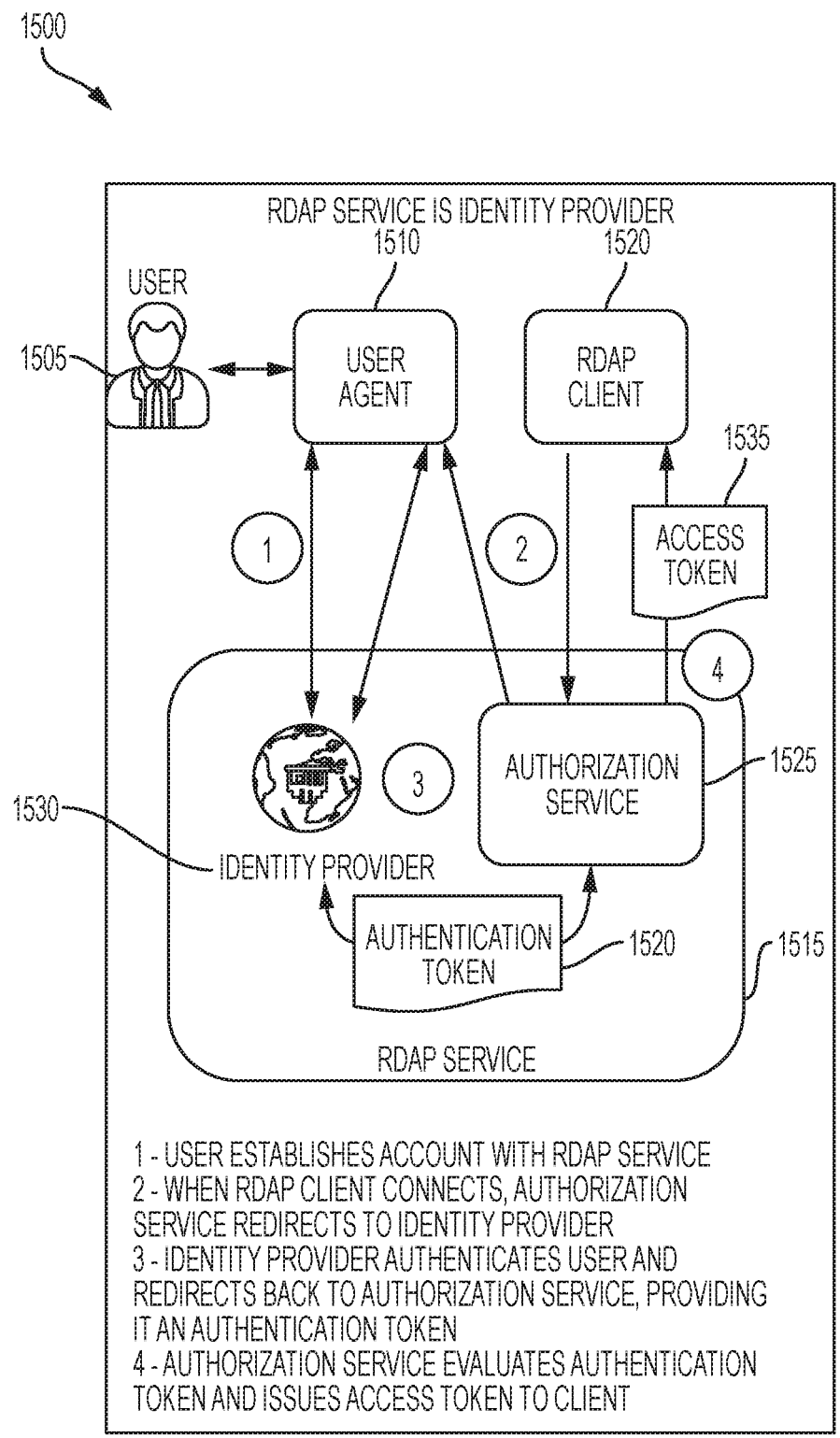
FIG. 15 shows a RDAP authentication process where the RDAP service is the identity provider, according to examples of the present disclosure.

FIG. 15 shows a RDAP authentication process where the RDAP service is the identity provider 1500, according to examples of the present disclosure. RDAP user 1505 communicates with user agent 1510 to establish account with RDAP service 1515. When RDAP client 1520 connects, authorization service 1525 redirects to identify provider 1530. Identify provider 1530 authenticates RDAP user 1505 and redirects back to authorization service 1525 providing it authentication token 1520. Authorization service 1525 evaluates authentication token 1535 and issues access token 1535 to RDAP client 520.

Figure 16:
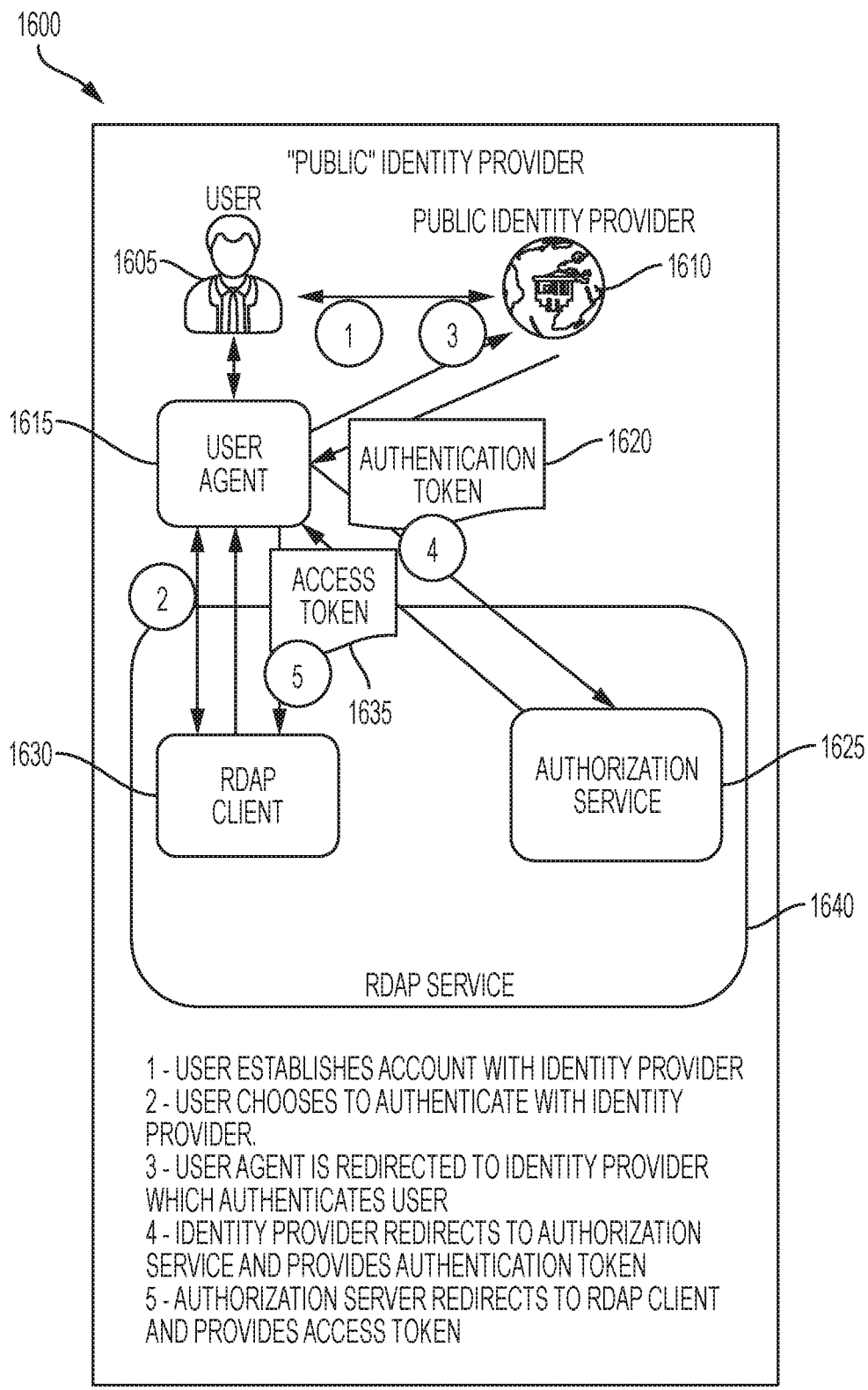
FIG. 16 shows a RDAP authentication process using a general identity provider, according to examples of the present disclosure

FIG. 16 shows a RDAP authentication process using a general identity provider 1600, such as a public identity provider, according to examples of the present disclosure. RDAP user 1605 communicates with public identity provider 1610 to establish an account. RDAP user 1605 chooses to authenticate with identity provider 1610. User agent 1615 is then redirected to identity provider 1610 which authenticates RDAP user 1605. RDAP service 1640 includes authorization service 1625 and RDAP client 1630. Identity provider 1610 redirects to authentication service 1605 and provides authentication token 1620. Authorization service 1625 redirects to RDAP client 1630 and provides access token 1635.

Figure 17:
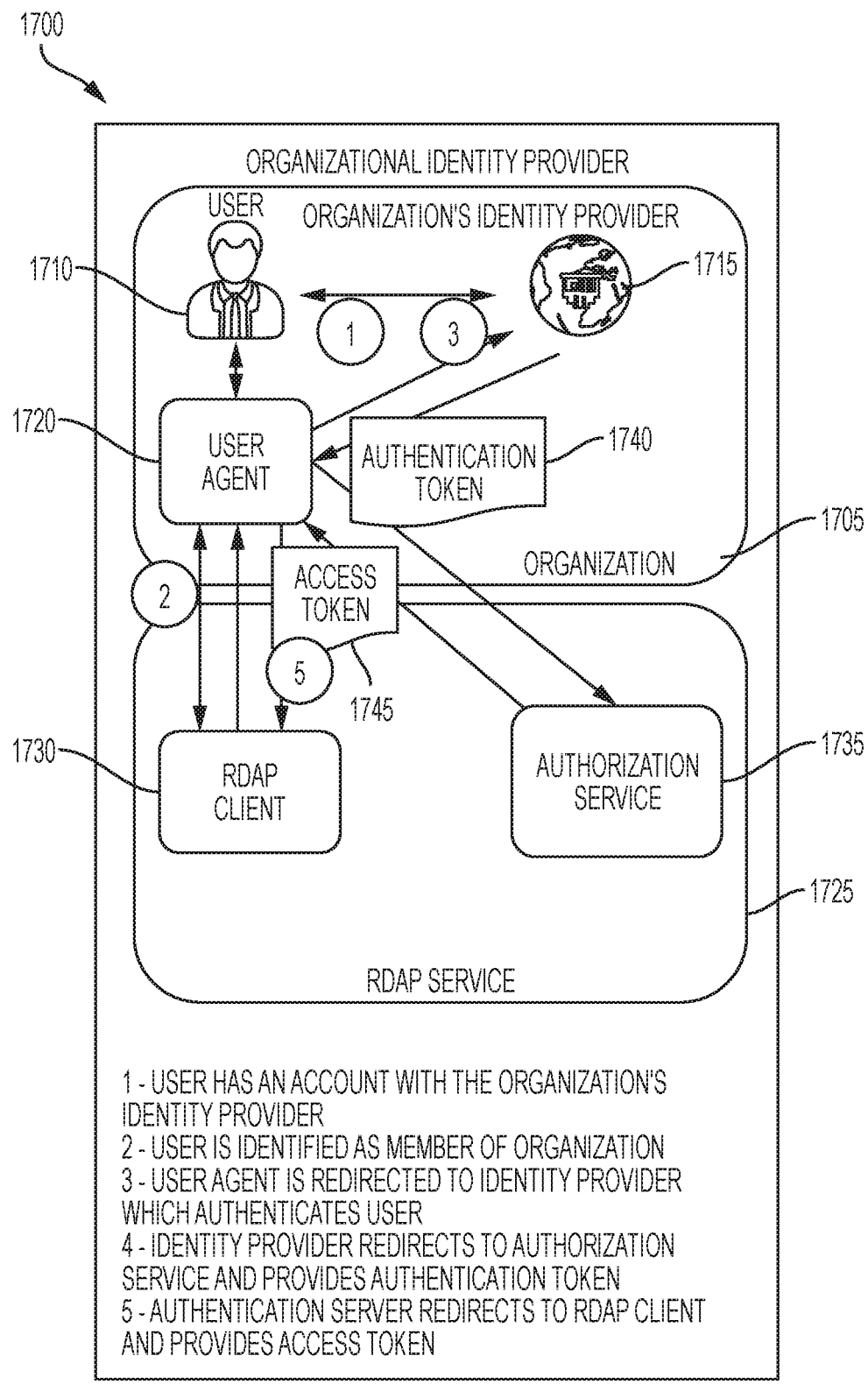
FIG. 17 shows a RDAP authentication process where an organizational identity provider is the identity provider, according to examples of the present disclosure.

FIG. 17 shows a RDAP authentication process where an organizational identity provider is the identity provider 1700, according to examples of the present disclosure. Organization 1705 includes RDAP user 1710, organization's identity provider 1715, and user agent 1720. RDAP service 1725 includes RDAP client 1730 and authorization service 1735. RDAP user 1710 has an account with organization's identity provider 1715. RDAP user 1710 is identified as a member of organization 1705. User agent 1720 is redirected to identity provider 1715 which authenticates RDAP user 1710. Identity provider 1715 redirects to authorization service 1735 and provides authentication token 1740. Authorization service 1735 redirects RDAP client 1730 and provides access token 1745.

Figure 18:
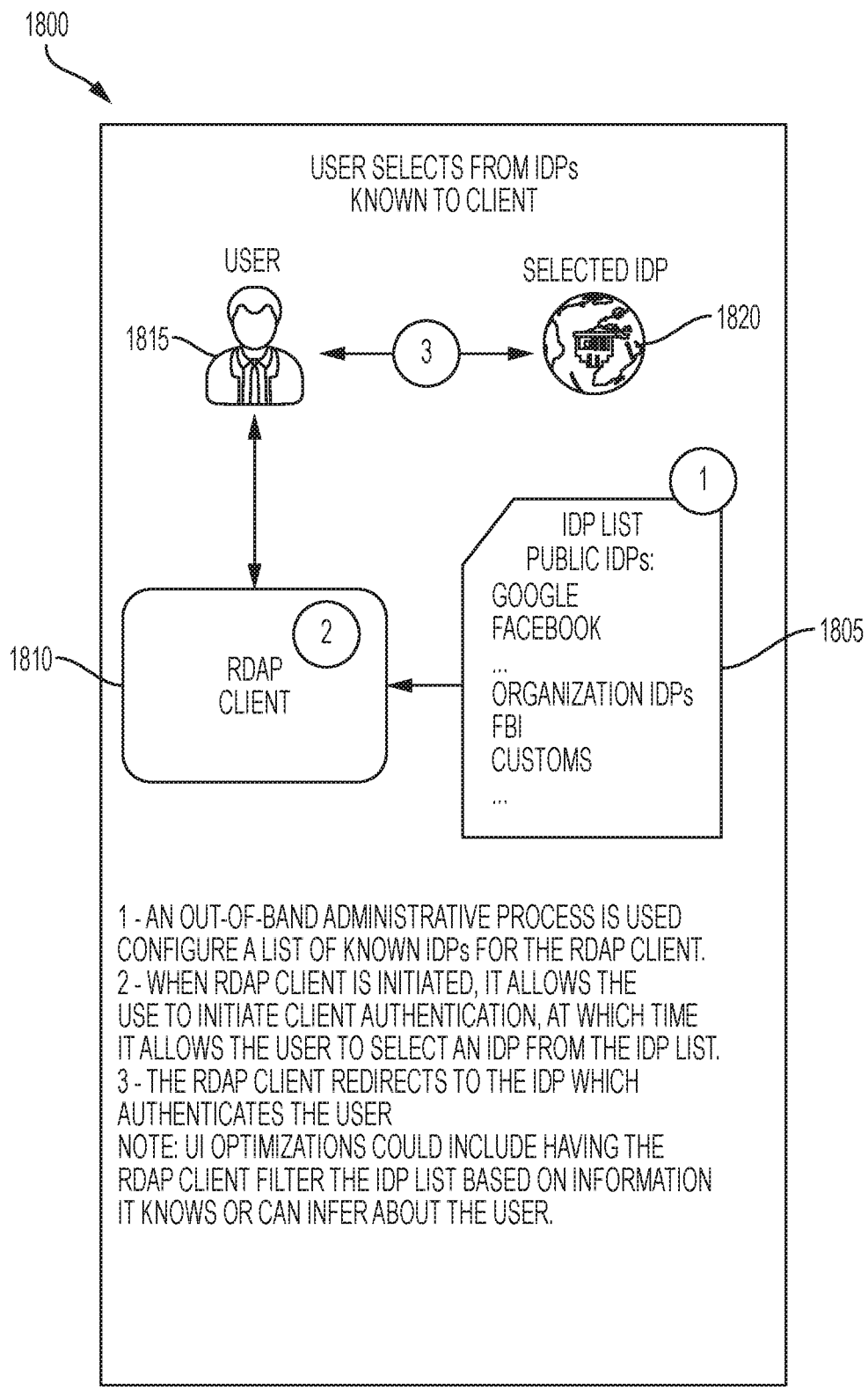
FIG. 18 shows an IDP selection process, according to examples of the present disclosure.

FIG. 18 shows an IDP selection process 1800, according to examples of the present disclosure. An out-of-band administrative process is used to configure IDP list 1805 of known IDPs for RDAP client 1810. When RDAP client 1810 is initiated, it allows RDAP user 1815 to initiate client authentication, at which time it allows RDAP user 1815 to select an IDP from IDP list 1805. RDAP client 1810 redirects to selected IDP 1820, which authenticates RDAP user 1815. In some examples, RDAP client can filter IDP list 1805 based on information it knows or can infer about RDAP user 1815.

Figure 19:
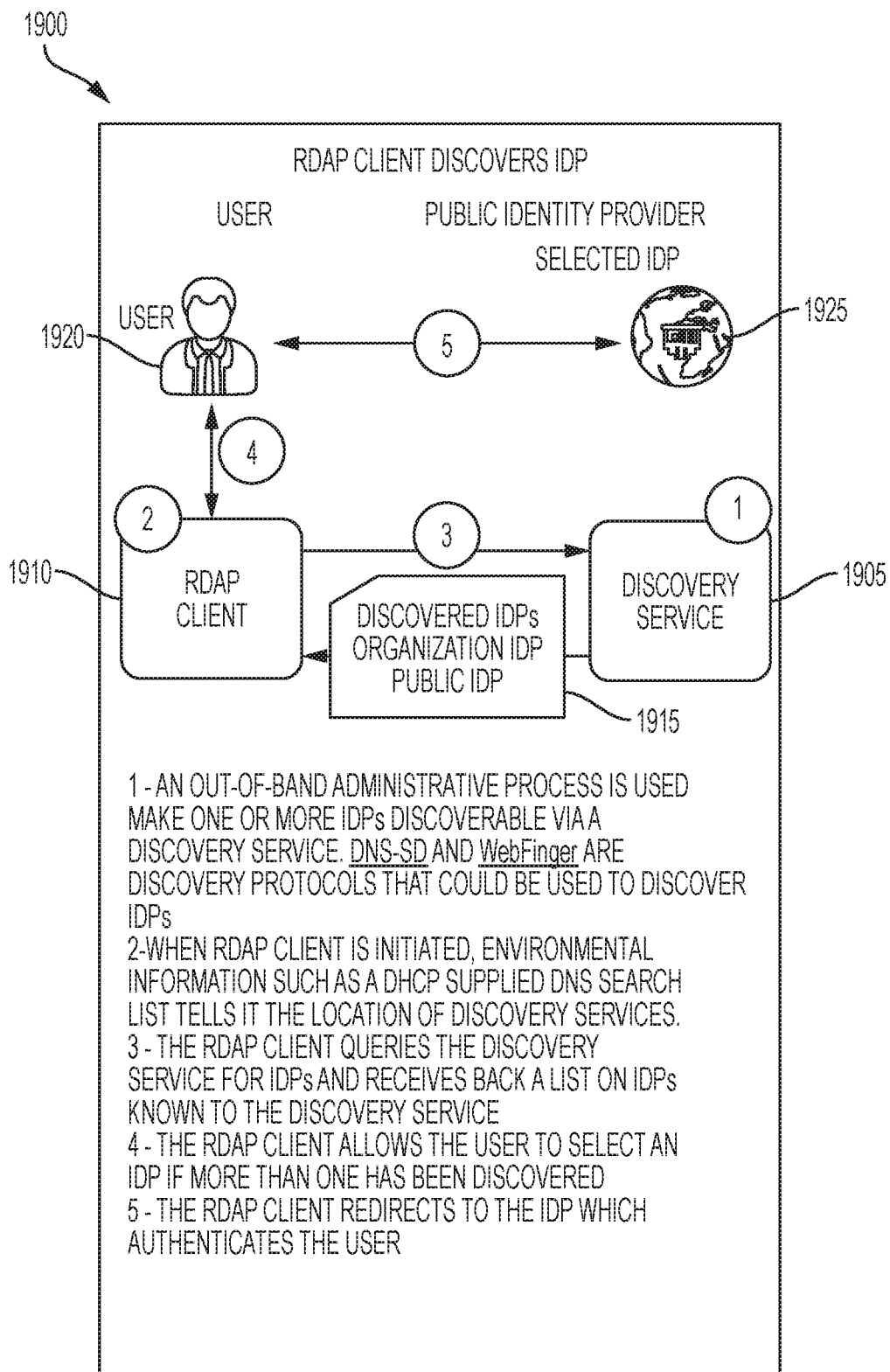
FIG. 19 shows another IDP selection process, according to examples of the present disclosure.

FIG. 19 shows another IDP selection process 1900, according to examples of the present disclosure. An out-of-band administrative process is used to make one or more IDPs discoverable via discovery service 1905. DNS-SID and Webfinger are discovery protocols that could be used to discover IDPs. When RDAP client 1910 is initiated, environmental information, such as a DHCP supplied DNS search list, tells it the location of discovery service 1905. RDAP client 1910 queries discovery service 1905 for IDPs and receives back a list 1915 on IDPs known to discovery service 1905. RDAP client 1910 allows RDAP user 1920 to select an IDP if more than one has been discovered. RDAP client redirects to selected IDP 1925 which authenticates RDAP user 1920.

Figure 20:
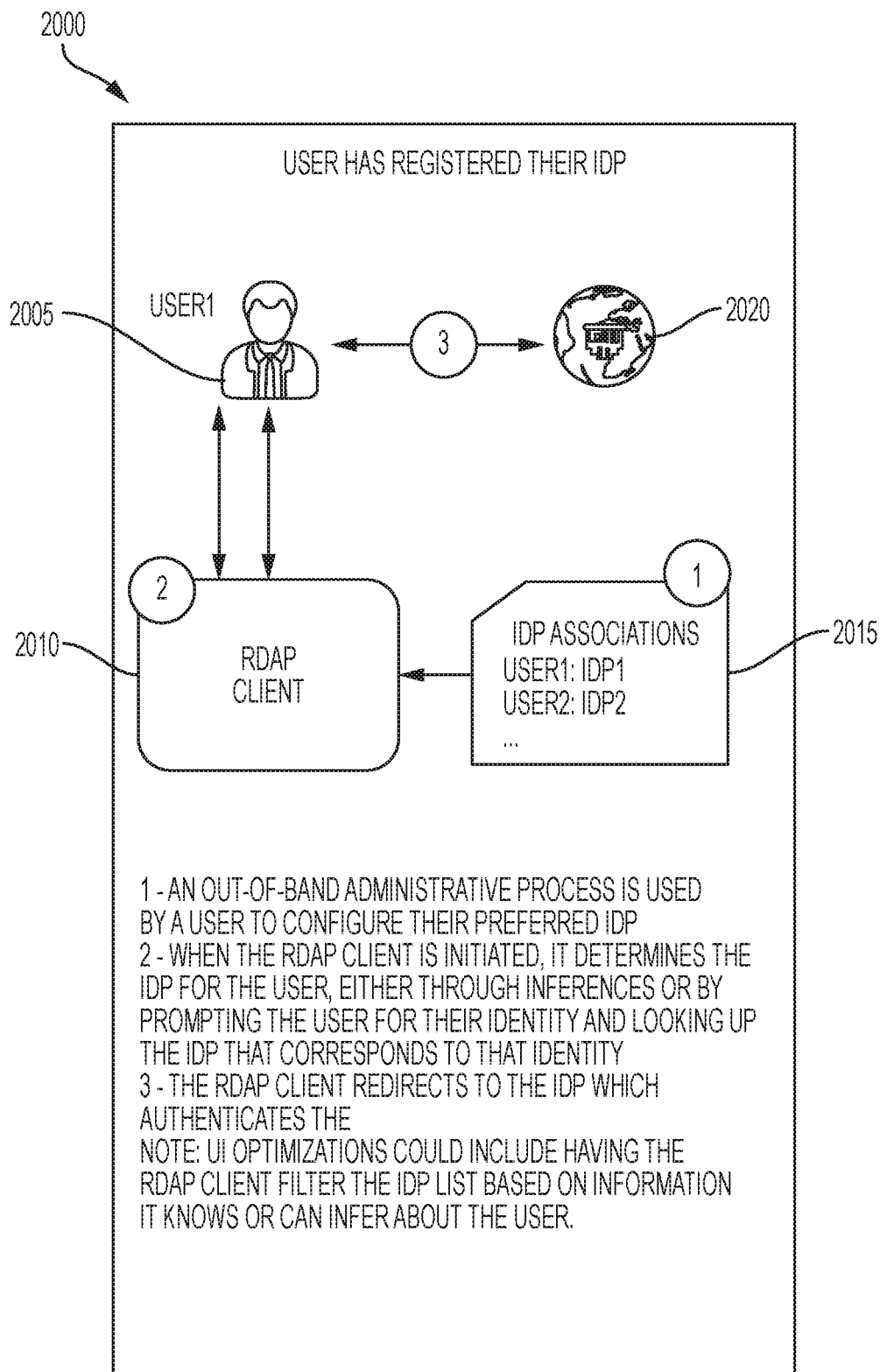
FIG. 20 shows yet another IDP selection process, according to examples of the present disclosure.

FIG. 20 shows yet another IDP selection process 2000, according to examples of the present disclosure. An out-of-band administrative process is used by RDAP user 2005 to configure their preferred IDP. When RDAP client 2010 is initiated, it determines the IDP for RDAP user 2005 using IDP association list 2015, either through inferences or by prompting RDAP user 2005 for their identity and looking up the IDP that corresponds to that identity. RDAP client 2010 redirects to selected IDP 2020 which authenticates RDAP user 2005. In some examples, RDAP client 2010 can filter the IDP list based on information it knows or can infer about RDAP user 2005.

In some circumstances, it may be beneficial not to have personal identifying information (PII) or other sensitive information stored on or passing through the virtual thick RDAP service in an unencrypted form or in an encrypted form that the service could decrypt. Accordingly, example mechanisms are provided for encryption of RDAP responses by RDAP services queried by the virtual thick RDAP service, with decryption available to the RDAP clients, but not the virtual thick RDAP service. As a result, for the purposes of the encrypted information, the virtual thick RDAP service takes the role of a proxy acting on behalf of but without full access to all information of the RDAP client. In the following, the term "proxy" is added to make "virtual thick RDAP service proxy" to illustrate this role. RDAP clients that interact with the proxy can provide their public key to the proxy, which can then provide the public key to other RDAP services that the proxy queries in order to compose a response to an RDAP query. The other RDAP services can encrypt their RDAP responses to the proxy with the public key of the RDAP client before sending them to the proxy. The proxy can incorporate the encrypted RDAP responses into a consolidated RDAP response that it provides to the RDAP client. The RDAP client can use the private key corresponding to its public key to decrypt the encrypted elements in the consolidated RDAP response. Because the proxy itself does not have the client's private key, the proxy typically may have no direct means for decrypting the encrypted responses it receives from other RDAP servers, and thus may not have access to the PII.

Figure 21:
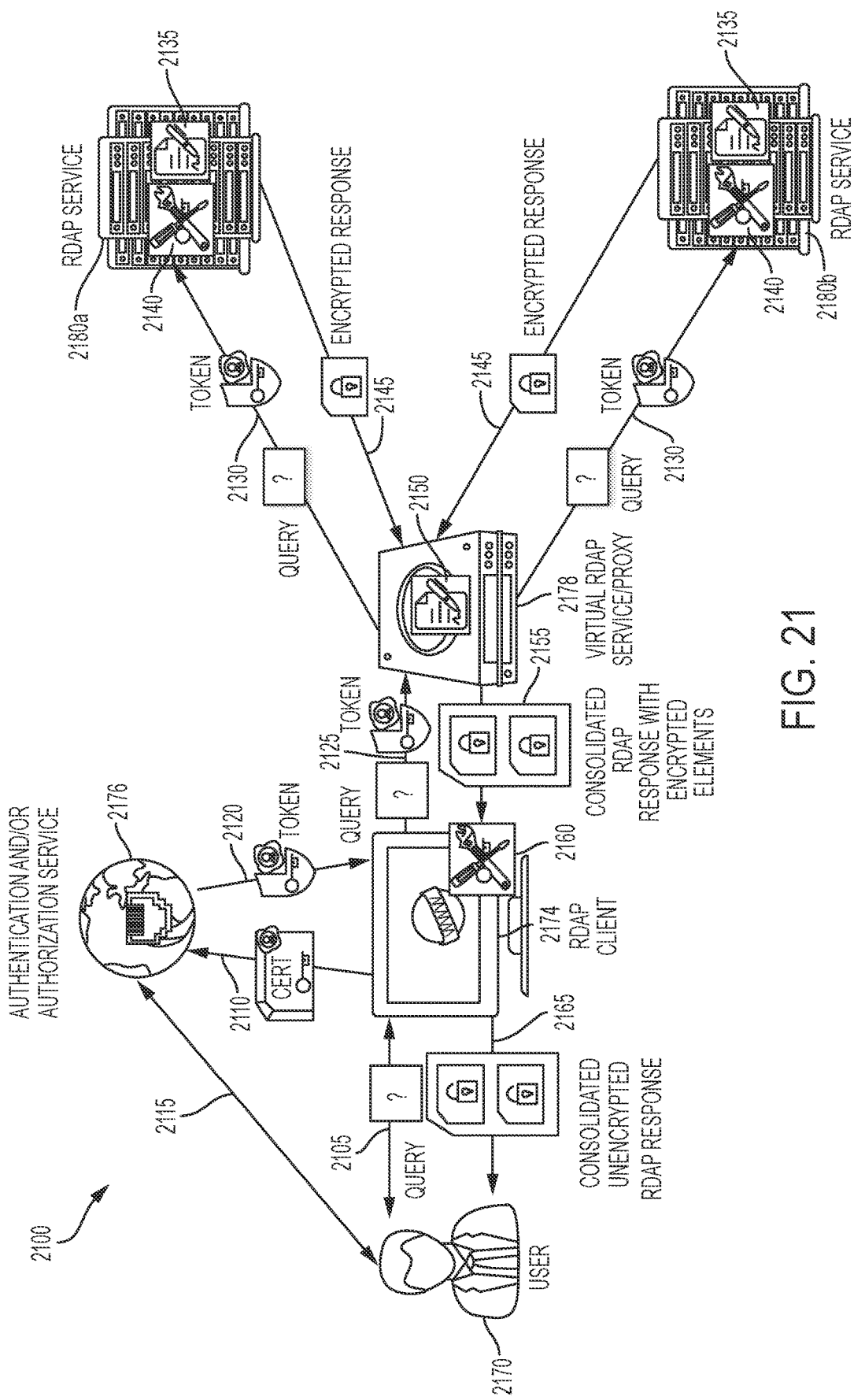
FIG. 21 shows a process using RDAP services to encrypt RDAP responses for queries received from the proxy, with decryption available to the RDAP clients, but not the proxy, according to examples of the present disclosure.

FIG. 21 shows a process 2100 using a proxy service to provide encryption of RDAP responses by RDAP services queried by the proxy, with decryption available to the RDAP clients, but not the proxy, according to examples of the present disclosure. At 2105, a user 2170 initiates a session with RDAP client 2174 and submits a query. At 2110, RDAP client 2174 determines that it must authenticate the user 2170, and so redirects the user 2170 to an authentication/authorization server 2176. A X.509 certificate or public key of the RDAP client 2174 is sent to the authentication/authorization server 2176 as a parameter on the redirect. The RDAP client 2174 can authenticate its request to the authentication/authorization server 2176 by including the X.509 certificate or the public key and by signing it with the private key of the RDAP client 2174. This provides proof of origin to the authentication/authorization server 2176. The process for sending the client's public key to the authentication/authorization server 2176 can be based on an internet standard, such as an OAuth 2.0 profile specification or an extension of the OpenID Connect standard. At 2115, the authentication/authorization server 2176 authenticates the user 2170. At 2120, the authentication/authorization 2176 generates a token (authentication token or access token) containing the public key of the RDAP client 2174 extracted from the X.509 certificate of the RDAP client 2174 and provides the token to the RDAP client 2174 as a parameter on the redirect. At 2125, the RDAP client 2174 sends the query and the token to a virtual thick RDAP service proxy 2178. At 2130, the virtual thick RDAP service proxy 2178 sends the query and the token to RDAP servers 2180a, 2180b that have the data necessary for resolving the query. At 2135, RDAP servers 2180a, 2180b can create RDAP responses to the query. At 2140, RDAP servers 2180a, 2180b encrypt RDAP responses using the public key of the RDAP client 2174 which the RDAP servers 2180a, 2180b have extracted from the token. In one example, RDAP servers 2180a, 2180b can use Javascript to encrypt the RDAP responses using the Javascript Object Signing and Encryption (JOSE) API. At 2145, RDAP servers 2180a, 2180b send encrypted RDAP responses to the virtual thick RDAP service proxy 2178. At 2150, the virtual thick RDAP service proxy 2178 creates a consolidated RDAP response containing the encrypted RDAP responses received from RDAP servers 2180a, 2180b. At 2155, the consolidated RDAP response containing encrypted RDAP responses is sent from virtual thick RDAP service proxy 2178 to RDAP client 2174. At 2160, RDAP client 2174 creates an unencrypted consolidated RDAP response by using the private key corresponding to the public key of the RDAP client 2174 to decrypt the encrypted RDAP responses found in the encrypted consolidated RDAP response. At 2165, the unencrypted consolidated RDAP response is provided to the user 2170. (The foregoing is an example of "asymmetric" cryptography, since RDAP services 2180a, 2180b encrypt with a public key associated with the RDAP client 2174, and RDAP client 2174 decrypts with a corresponding, but different private key.)

Although not explicitly stated, a single user 2170 is associated with the RDAP client 2174 in FIG. 21. In some examples, there may be more than one user associated with the RDAP client 2174. In this example, the token and/or the keys may be associated with a user from among the more than one users instead of the RDAP client 2174. Additionally, or alternatively, in some examples, the RDAP client 2174 may process queries in a batch mode without an immediate user present.

In some examples, the process 2100 can provide for selective encryption, where RDAP service 2180a, 2180b can encrypt some elements of responses, but not others, according to a policy. The virtual thick RDAP service proxy 2178 can see the unencrypted response elements, which may be useful for its local processing and optimization. In this example and the example described above in FIG. 21, the session between the virtual thick RDAP service proxy 2178 and the target RDAP service 2180a, 2180b may use the encryption-related interactions of FIG. 21 in support of selective encryption, and similarly the session between the virtual thick RDAP service proxy 2178 and the RDAP client 2174 may use the encryption-related interactions of FIG. 21 in support of selective encryption.

Figure 22:
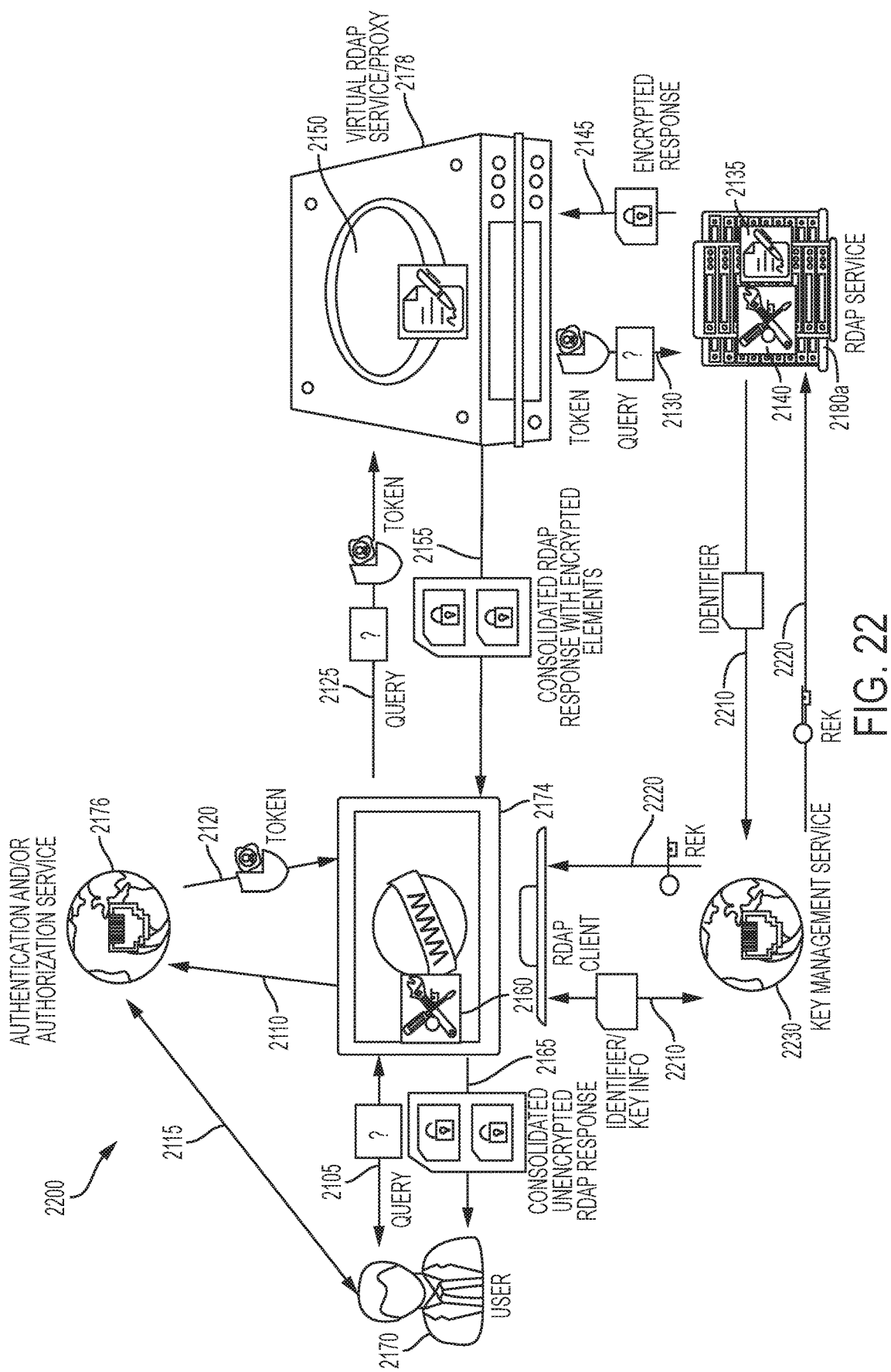
FIG. 22 shows a process to provide for key management optimizations and variants of process of FIG. 21.

FIG. 22 shows a process 2200 to provide for key management optimizations and variants of process 2100. In a basic mode, RDAP servers 2180a, 2810b encrypt responses to the RDAP client 2174 with the public key of the RDAP client 2174 (2140). However, in practice, encrypting each response/object separately with the public key may result in very large encrypted responses. Instead, RDAP servers 2180a, 2180b may encrypt or otherwise establish one or more response encryption keys (REK) via a key management operation, via a key management service 2230, at 2210 and 2220 involving the public key of the RDAP client 2174. The RDAP client 2174 can obtain the REK(s) via a complementary operation involving its private key. The RDAP servers 2180a, 2180b can then encrypt individual responses/objects, etc. with the REKs (or other keys derived from or established via them), and the RDAP client 2174 can decrypt the elements with the REKs. (The foregoing is an example of "symmetric" cryptography, since RDAP services 2180a, 2180b encrypt with one or more REKs associated with the RDAP client 2174, and RDAP client 2174 decrypts with the same REKs.)

In some examples, the processes 2100 and 2200 can provide for multiple public keys, where the authentication/authorization server 2176 can present more than one public key in association with the RDAP client 2174, e.g., keys with different validity periods, algorithms, key sizes, etc. This may be helpful if different RDAP servers have different policies about which public key types they can use, or different implementation profiles. Since the RDAP client 2174 does not know explicitly which RDAP servers are involved (because its only interface is via the proxy), the presence of multiple public keys will give more options for interoperability. The proxy could assemble a list of acceptable algorithms/profiles, derived from information obtained from the RDAP servers, to focus the set of included keys.

In some examples, the processes 2100 and 2200 can provide for use of alternate public key sources. In this example, the public key of the RDAP client 2174 may come from a different source than the X.509 certificate, e.g., a key management server operating a key management service 2230, or a DNS server (via DANE).

In some examples, the processes 2100 and 2200 can provide for indirect keying, where instead of including the key of the RDAP client 2174 explicitly, the request to the RDAP server 2180a, 2180b can include a key identifier, certificate identifier, key hash, or some other information that enables the RDAP server to obtain the public key of the RDAP client 2174. This would reduce the size of transactions, especially when the same RDAP client makes repeated requests.

In some examples, the process 2200 can provide the key management service 2230 rather than encrypting/establishing an REK using the public key of the RDAP client 2174. The REK can be established with the RDAP client 2174 via a separate key management service 2230 with which RDAP servers 2180a, 2180b and the RDAP client 2174 have a relationship. The request to the RDAP server 2180a, 2180b would then only need to include either the identifier of the RDAP client 2174 or another identifier of the account of the RDAP client 2174 at the key management service 2230. At 2210 and 2220, RDAP servers 2180a, 2180b can then interact with the key management service 2230 to establish the REK, and encrypt the RDAP response/object with the REK (or a key derived from it). At 2210 and 2220, the RDAP client 2174 can similarly interact with the key management service 2230 to obtain its copy of the REK, and then decrypt. In one example of a key management service 2230, the RDAP client 2174 and/or the RDAP server 2180a, 2180b do not need to have a public/private key pair at all—just an authenticated account with the key management service 2230, so that each can obtain the REK securely.

In some examples, the process 2100 can provide for identity and attribute-based encryption. In this example, the RDAP server 2180a, 2180b can encrypt the response using the identity of the RDAP client 2174 and/or attributes as the "public key" via techniques known in the art. This can use a key management service 2230, as discussed above, that provides access to the corresponding "private key" to authenticated/authorized clients.

In some examples, the process 2200 can provide for privacy extensions where the RDAP service does not necessarily know the actual identity the RDAP client 2174, while still being able to encrypt in such a way that only authorized clients can decrypt. In this example, the authentication/authorization token can specify that the RDAP client 2174 belongs to a certain group (e.g., "law enforcement") without specifying the actual identity. The RDAP server can then encrypt responses with a key associated with that group. At 2210 and 2220, the RDAP client 2174 can obtain the key from a key management service.

In some examples, the processes 2100 and 2200 can provide for alternate bindings where the RDAP server can confirm the association of the public key/key identifier/identity/group/etc. of the RDAP client 2174 by interacting directly with the authentication/authorization server 2176, or via other information, rather than having the binding expressed directly in the token.

Figure 23:
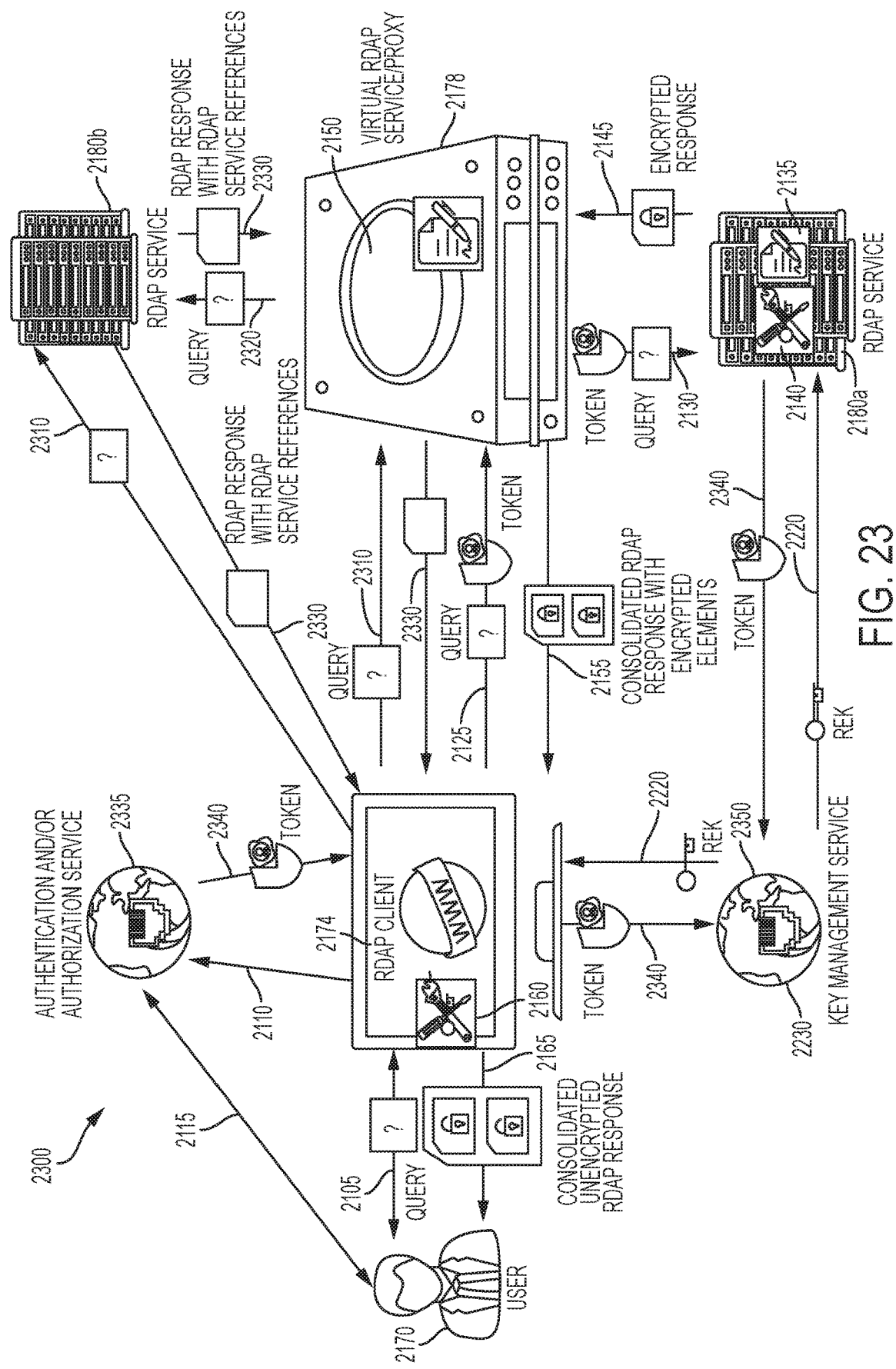
FIG. 23 shows a process that show variants of processes of FIGS. 21 and 22 to provide for a key provisioning service (IDP or a key management service that has a trust relationship with the IDP) to establish and securely provide a REK associated with an IDP produced access token, according to examples of the present disclosure.

FIG. 23 shows a process 2300 that show variants of processes 2100 and 2200 to provide for a key provisioning service (IDP 1130 or a key management service 2230 that has a trust relationship with the IDP 1130) to establish and securely provide a REK associated with an IDP produced access token. RDAP clients and RDAP services can request a REK using this capability in a way that would exclude the proxy and other parties from accessing the REK and not require additional key-management specific authentication. When requesting a REK from the key provisioning service, RDAP clients and RDAP services provide an access token produced by the IDP 1130 for the RDAP client 2174. RDAP clients and services would be successfully authenticated by the key provisioning service based on verifying the IDP 1130 as the source of the access token and based on claims found in the access token that identify entities allowed to retrieve a REK associated with the access token. In detail, the processing steps required for this process include the following. The RDAP Client 2174 identifies the RDAP services that will be interacted with to produce the thick RDAP response containing encrypted elements. At 2310, 2320 and 2330, the RDAP client 2174 determines these RDAP services by performing a RDAP referral search process 900 as described above in relation to FIG. 9. In some examples, the RDAP client 2174 may perform the referral search directly to an RDAP service. In some examples, the RDAP client 2174 may perform the referral search through the proxy 2178. The RDAP client 2174 then parses the received RDAP referral search response and identifies the RDAP services that may provide thick response elements that should be encrypted by the identified RDAP services. At 2110, 2115 and 2340, the RDAP client 2174 is then authenticated by an IDP 1130 using one of the methods described herein and including additional processing to identify to the IDP 1130 the domain names of the identified RDAP services. In some examples, at 2110, the process for providing domain names of identified RDAP services would include having the RDAP client 2174 identify them to the IDP 1130 as part of an authentication request for the RDAP client 2174. At 2335, the IDP 1130 will then place audience claims containing the domain names of the identified RDAP services into the access token that it creates for the authenticated RDAP client 2174. At 2335, the IDP 1130 also puts a client identifier claim into the access token that identifies the domain name of the RDAP client 2174 and also puts a claim into the access token that identifies the domain name of the IDP 1130. At 2335, additional audience claims may be put into the access token to identify additional domains that are authorized to access a REK associated with the access token. After receiving the access token, at 2125, the RDAP client 2174 then provides the access token to the proxy 2178 with the original query and an indication that a thick response is needed as described herein. At 2130, the access token is then provided to RDAP services queried by the proxy 2178 as described herein. The RDAP client 2174, the RDAP services, and other domains identified by audience claims in the access token can then use the token to be authorized to retrieve a REK from the key provisioning service to use for encryption and decryption as follows. At 2340, a request for the REK is made to the key provisioning service from the domain of the RDAP client 2174 or RDAP service or other domain that has been identified in the access token with an audience claim. The request includes the access token previously generated by the IDP 1130. This request may be made over a secure connection such as TLS. At 2350, on receiving the request, the key provisioning service will verify the domain name of the requestor. For a TLS connection, this can be performed by requiring the requestor to provide a X.509 certificate during TLS session setup and then verifying the identity of the requestor using well-known cryptographic methods. Other methods of verifying the identity of the requestor could be used. At 2350, after verifying the identity of the requestor, the key provisioning service will verify that a trusted IDP 1130 is the producer of the access token by examining the IDP 1130 identified in the access token and verifying the cryptographic signature of the IDP 1130 on the access token. At 2350, in some examples where the IDP 1130 is also acting as a key management service 2230, the IDP 1130 implicitly has a trust relationship with itself. At 2350, if the token is successfully verified, the key provisioning service will then examine the token to see if the domain of the requestor is identified in either a client identity claim or in an audience claim. If the domain is identified, then at 2220, the key provisioning service will return to the requestor a REK that the key provisioning service has associated with the access token.

The described processing ensures that only the specific entities identified in the access token can retrieve the REK from the key provisioning service. This provides the means for secure encrypted transmissions between RDAP services and RDAP clients. Other entities not identified in the access token are excluded from being able to retrieve the REK and are therefore blocked from having the capability to decrypt transmissions encrypted with the REK. For instance, typically the proxy will not be identified in the access token and will therefore not be able to retrieve the REK. Entities that can retrieve the REK, such as the RDAP client and the identified RDAP services, can use the REK for encryption and decryption processing. In addition to providing a means for secured encrypted transmissions, the process also supports optimized cryptographic processing. A REK produced by the process could be cached by RDAP services and RDAP clients and then re-used for encrypting and decrypting future transmissions without need to again retrieve the REK from the key provisioning service. For improved security, a time-to-live (TTL) value can be associated with a REK to limit the amount of time it could be cached and prompt the generation and use of a new REK on expiration of the TTL. A REK can be a symmetric cryptographic key that provides for less resource intensive encryption and decryption processing. In some examples, the process described herein for distribution of a REK associated with an access token can be generalized as a method by which a provisioning service is used to provide resources to a restricted audience based on claims found in a security token.

In some examples, the authentication and authorization processes of the example of the disclosure could be performed using various types of authentication and authorization services, and various types of tokens, and which in combination provide functionally equivalent authentication and authorization as described herein.

Figure 24:
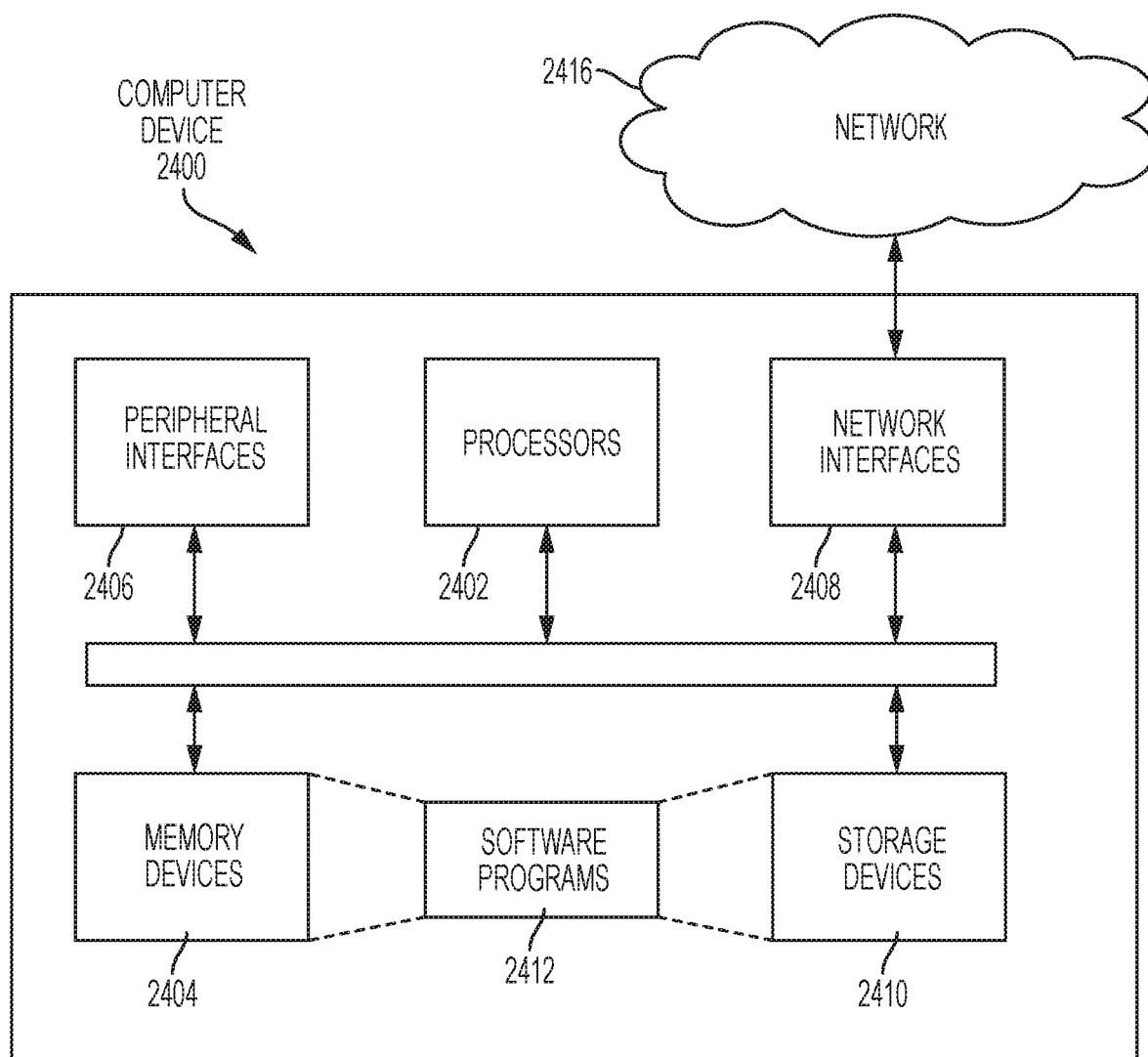
FIG. 24 illustrates an example of a hardware configuration for a computer device, which can be used to perform one or more of the processes described above.

FIG. 24 illustrates an example of a hardware configuration for computer device 2400 that can be used as mobile device or server, which can be used to perform one or more of the processes described above. While FIG. 24 illustrates various components contained in computer device 2400, FIG. 24 illustrates one example of a computer device and additional components can be added and existing components can be removed.

Computer device 2400 can be any type of computer devices, such as desktops, laptops, servers, DNS server, etc., or mobile devices, such as smart telephones, tablet computers, cellular telephones, personal digital assistants, etc. As illustrated in FIG. 24, computer device 2400 can include one or more processors 2402 of varying core configurations and clock frequencies. Computer device 2400 can also include one or more memory devices 2404 that serve as a main memory during the operation of computer device 2400. For example, during operation, a copy of the software that supports the DNS operations can be stored in one or more memory devices 2404. Computer device 2400 can also include one or more peripheral interfaces 2406, such as keyboards, mice, touchpads, computer screens, touchscreens, etc., for enabling human interaction with and manipulation of computer device 2400.

The computer device 2400 can also include one or more network interfaces 2408 for communicating via one or more networks, such as Ethernet adapters, wireless transceivers, or serial network components, for communicating over wired or wireless media using protocols. The computer device 2400 can also include one or more storage device 2410 of varying physical dimensions and storage capacities, such as flash drives, hard drives, random access memory, etc., for storing data, such as images, files, and program instructions for execution by one or more processors 2402.

Additionally, computer device 2400 can include one or more software programs 2412 that enable the functionality described above. One or more software programs 2412 can include instructions that cause one or more processors 2402 to perform the processes described herein. Copies of one or more software programs 2412 can be stored in one or more memory devices 2404 and/or on in one or more storage devices 2410. Likewise, the data, for example, the DNS registry data, DNS registrar data, authentication and/or authorization data utilized by one or more software programs 2412 can be stored in one or more memory devices 2404 and/or on in one or more storage devices 2410.

In implementations, computer device 2400 can communicate with other devices via network 2416. The other devices can be any types of devices as described above. Network 2416 can be any type of electronic network, such as a local area network, a wide-area network, a virtual private network, the Internet, an intranet, an extranet, a public switched telephone network, an infrared network, a wireless network, and any combination thereof. Network 2416 can support communications using any of a variety of commercially-available protocols, such as TCP/IP, UDP, OSI, FTP, UPnP, NFS, CIFS, AppleTalk, and the like. Network 2116 can be, for example, a local area network, a wide-area network, a virtual private network, the Internet, an intranet, an extranet, a public switched telephone network, an infrared network, a wireless network, and any combination thereof.

Computer device 2400 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of computer device 2400 as described above need not be enclosed within a single enclosure or even located in close proximity to one another. Those skilled in the art will appreciate that the above-described componentry are examples only, as computer device 2400 can include any type of hardware componentry, including any necessary accompanying firmware or software, for performing the disclosed implementations. Computer device 2400 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

What is claimed is:

1. A method for providing an Registration Data Access Protocol ("RDAP") response, the method comprising:
    obtaining, at a RDAP client over a network, a RDAP query for RDAP data from a user;
    providing, by the RDAP client, the RDAP query and a cryptographic credential to a RDAP server, wherein the RDAP server communicates with a plurality of thick RDAP servers to provide respective thick RDAP answers to the RDAP query, wherein at least one thick RDAP answer is encrypted by at least one of the plurality of thick RDAP servers using a first symmetric key or asymmetric key provided by a key management service and associated with the cryptographic credential of the RDAP client;
    obtaining, at the RDAP client, a consolidated thick and encrypted RDAP answer to the RDAP query from the RDAP server;
    decrypting, by the RDAP client, the consolidated thick and encrypted RDAP answer using a second symmetric key or asymmetric key associated with the cryptographic credential to produce a decrypted thick RDAP answer, wherein the second symmetric key or asymmetric key corresponds to the first symmetric key or asymmetric key; and
    providing, by the RDAP client, the decrypted thick RDAP answer to the user.

2. The method of claim 1, further comprising authorizing the user with an authorization service.

3. The method of claim 2, wherein the consolidated thick and encrypted RDAP answer is provided based on the user being authorized.

4. The method of claim 2, wherein the consolidated thick and encrypted RDAP answer is provided based on an access token issued by the authorization service and digitally signed by a private cryptographic key of the authorization service.

5. The method of claim 2, wherein the authorization service issues an authentication token for the user that comprises a claim that identifies a subject that has been authenticated.

6. The method of claim 1, further comprising obtaining an access token issued by an authorization service and digitally signed by a private cryptographic key of the authorization service.

7. The method of claim 1, wherein the first symmetric key or asymmetric key and the second symmetric key or asymmetric key have different validity periods.

8. The method of claim 1, wherein the key management service uses a claim in an access token to determine entities for which the key management service provides encryption keys.

9. The method of claim 1, further comprising:
    providing, by the RDAP client, a domain name of a first thick RDAP server from the plurality of thick RDAP servers to an identity provider; and
    obtaining, at the RDAP client, a cryptographic token from the identity provider based on the domain name, wherein the cryptographic token comprises an audience claim contained in the domain name of the first thick RDAP server.

10. A system for providing a Registration Data Access Protocol ("RDAP") response, the system comprising:
    one or more processors; and
    a memory system comprising one or more computer-readable media, wherein the one or more computer-readable media contain instructions that, when executed by the one or more processors, cause the one or more processors to perform operations comprising:
    obtaining, at a RDAP client over a network, a RDAP query for RDAP data from a user;
    providing, by the RDAP client, the RDAP query and a cryptographic credential to a RDAP server, wherein the RDAP server communicates with a plurality of thick RDAP servers to provide respective thick RDAP answers to the RDAP query, wherein at least one thick RDAP answer is encrypted using a first symmetric key or an asymmetric key provided by a key management service and associated with the cryptographic credential of the RDAP client;
    obtaining a consolidated thick and encrypted RDAP answer to the RDAP query from the RDAP server;
    decrypting the consolidated thick and encrypted RDAP answer using a second symmetric key or the asymmetric key associated with the cryptographic credential to produce a decrypted thick RDAP answer, wherein the second symmetric key or asymmetric key corresponds to the first symmetric key or asymmetric key; and
    providing the decrypted thick RDAP answer to the user.

11. The system of claim 10, wherein the one or more processors are further operable to perform operations comprising authorizing the user with an authorization service.

12. The system of claim 11, wherein the thick RDAP answer is provided based on the user being authorized.

13. The system of claim 11, wherein the thick RDAP answer is provided based on an access token issued by the authorization service and digitally signed by a private cryptographic key of the authorization service.

14. The system of claim 11, wherein the authorization service issues an authentication token for the user that comprises a claim that identifies a subject that has been authenticated.

15. The system of claim 10, wherein the one or more processors are further operable to perform operations comprising obtaining an access token issued by an authorization service and digitally signed by a private cryptographic key of the authorization service.

16. The system of claim 10, wherein the first symmetric key or asymmetric key and the second symmetric key or asymmetric key have different validity periods.

17. The system of claim 10 wherein the key management service uses a claim in an access token to determine entities for which the key management service provides encryption keys.

18. The system of claim 10, wherein the one or more processors are further operable to perform operations comprising:
    providing, by the RDAP client, a domain name of a first thick RDAP server from the plurality of thick RDAP servers to an identity provider; and
    obtaining, at the RDAP client, a cryptographic token from the identity provider based on the domain name, wherein the cryptographic token comprises an audience claim contained in the domain name of the first thick RDAP server.

* * * * *